United States Patent
Yang et al.

(10) Patent No.: US 11,272,570 B2
(45) Date of Patent: Mar. 8, 2022

(54) METHOD AND APPARATUS FOR TRANSMITTING AND RECEIVING DATA IN MESH NETWORK USING BLUETOOTH

(71) Applicant: LG ELECTRONICS INC., Seoul (KR)

(72) Inventors: Hyunsik Yang, Seoul (KR); Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 346 days.

(21) Appl. No.: 16/464,582

(22) PCT Filed: Nov. 28, 2017

(86) PCT No.: PCT/KR2017/013639
§ 371 (c)(1),
(2) Date: Nov. 6, 2019

(87) PCT Pub. No.: WO2018/097687
PCT Pub. Date: May 31, 2018

(65) Prior Publication Data
US 2020/0068656 A1 Feb. 27, 2020

Related U.S. Application Data

(60) Provisional application No. 62/427,122, filed on Nov. 28, 2016.

(51) Int. Cl.
*H04W 84/18* (2009.01)
*H04W 76/14* (2018.01)
(Continued)

(52) U.S. Cl.
CPC ............ *H04W 84/18* (2013.01); *H04W 4/80* (2018.02); *H04W 8/005* (2013.01); *H04W 12/50* (2021.01); *H04W 40/24* (2013.01); *H04W 76/14* (2018.02)

(58) Field of Classification Search
CPC ..... H04W 84/18; H04W 12/50; H04W 76/14; H04W 4/80; H04W 8/005; H04W 40/24
See application file for complete search history.

(56) References Cited

U.S. PATENT DOCUMENTS

| | | | |
|---|---|---|---|
| 2004/0170130 A1* | 9/2004 | Mehra | H04L 45/48 370/256 |
| 2008/0291855 A1* | 11/2008 | Bata | H04W 84/18 370/311 |

(Continued)

FOREIGN PATENT DOCUMENTS

| | | | |
|---|---|---|---|
| KR | 10-2009-0070883 A | 7/2009 | |
| KR | 10-2012-0102843 A | 9/2012 | |

(Continued)

*Primary Examiner* — Christine Ng
(74) *Attorney, Agent, or Firm* — Birch, Stewart, Kolasch & Birch, LLP

(57) ABSTRACT

Disclosed is a method for transmitting and receiving data by a first node in a Bluetooth mesh network. The method comprises the steps of: acquiring, from a control device for controlling the Bluetooth mesh network, a command message instructing to start a procedure for acquiring specific information of all nodes included in the Bluetooth mesh network; broadcasting a request packet for discovering a node near a first node; receiving a response packet to the request packet, from each of a plurality of nodes which have received the request packet; registering the plurality of nodes as low near nodes for the first node; and receiving a specific packet including the specific information from each of the plurality of nodes belonging to the low near nodes.

1 Claim, 17 Drawing Sheets

(51) Int. Cl.
*H04W 4/80* (2018.01)
*H04W 8/00* (2009.01)
*H04W 40/24* (2009.01)
*H04W 12/50* (2021.01)

(56) References Cited

U.S. PATENT DOCUMENTS

| | | | |
|---|---|---|---|
| 2013/0039219 A1* | 2/2013 | Lee | H04B 3/542 |
| | | | 370/255 |
| 2015/0117258 A1 | 4/2015 | Kim et al. | |
| 2016/0094398 A1* | 3/2016 | Choudhury | H04L 45/42 |
| | | | 370/254 |
| 2016/0255663 A1* | 9/2016 | Shin | H04W 36/24 |
| | | | 370/254 |
| 2018/0091361 A1* | 3/2018 | Smith | H04L 67/16 |
| 2018/0255506 A1* | 9/2018 | Wang | H04L 41/0806 |

FOREIGN PATENT DOCUMENTS

| | | |
|---|---|---|
| KR | 10-2013-0127690 A | 11/2013 |
| WO | WO 2016/175638 A1 | 11/2016 |

\* cited by examiner

[FIG. 1]
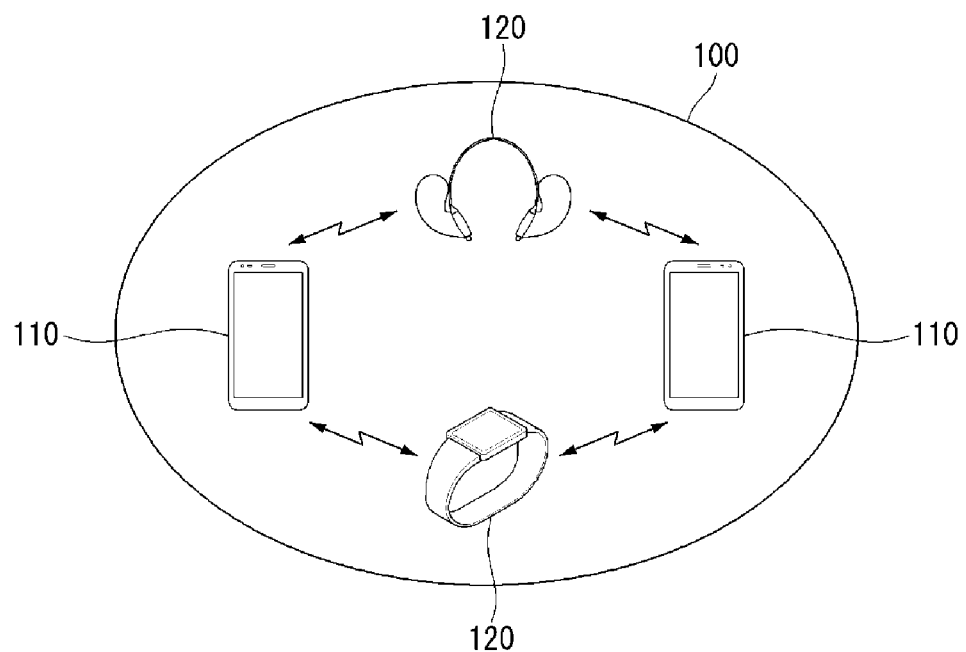

[FIG. 2]
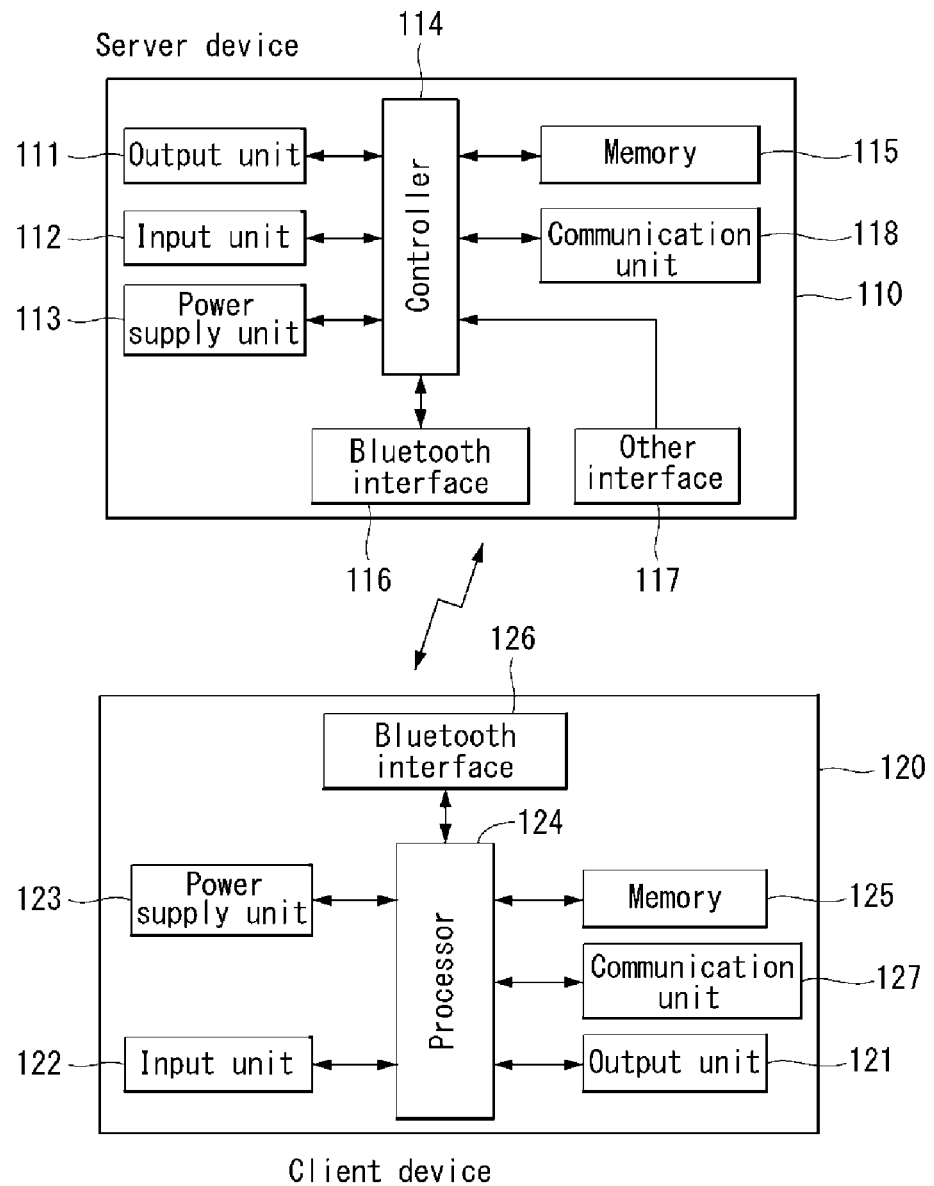

[FIG. 3]
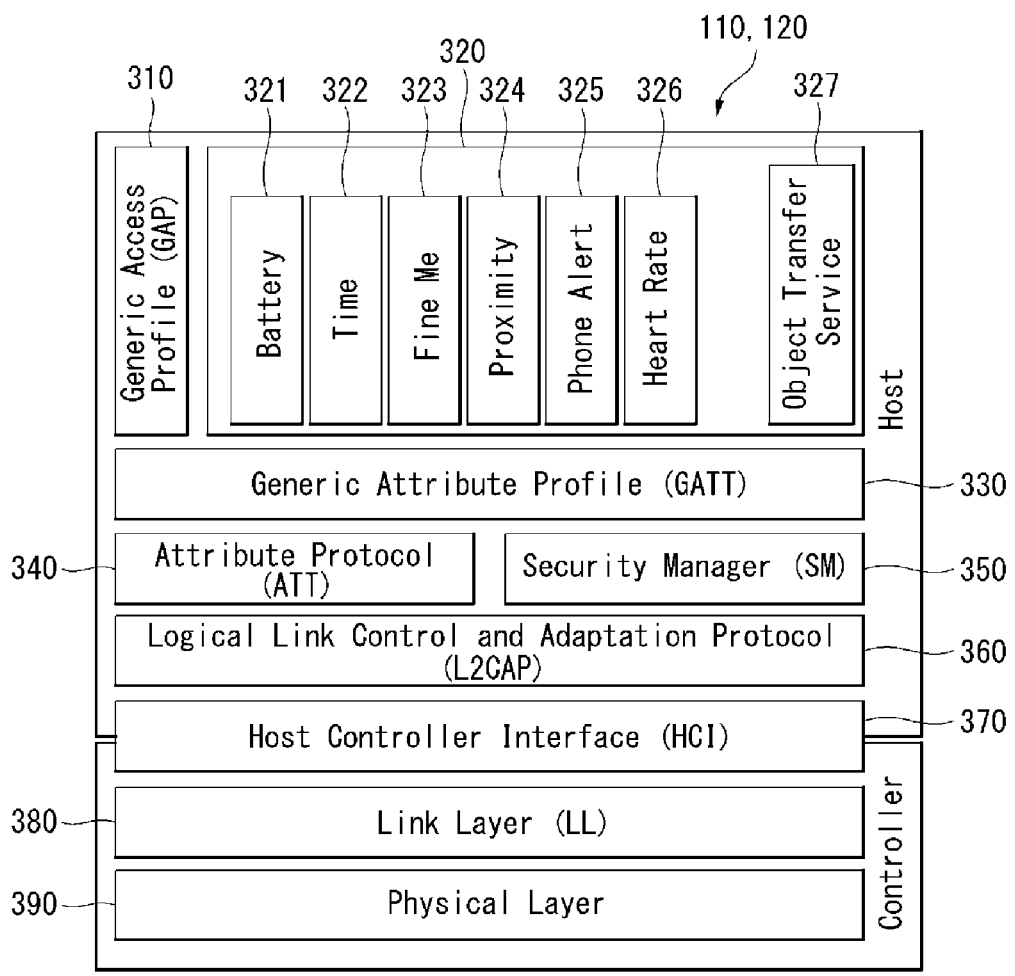

[FIG. 4]
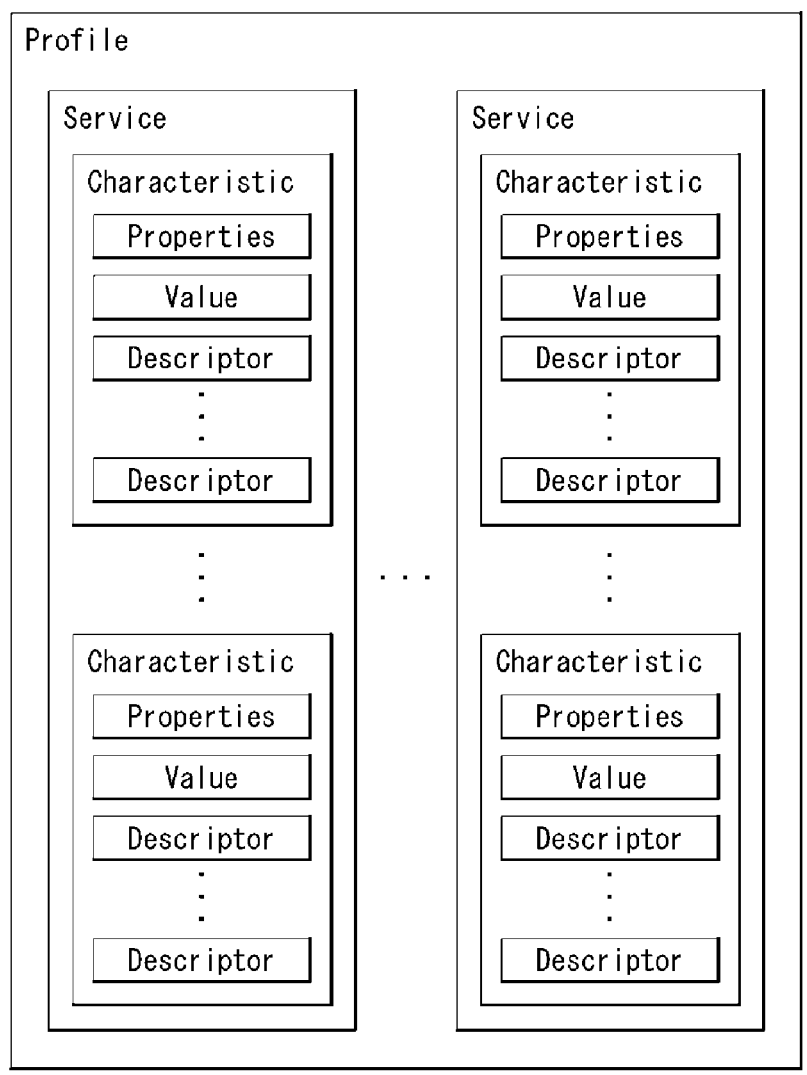

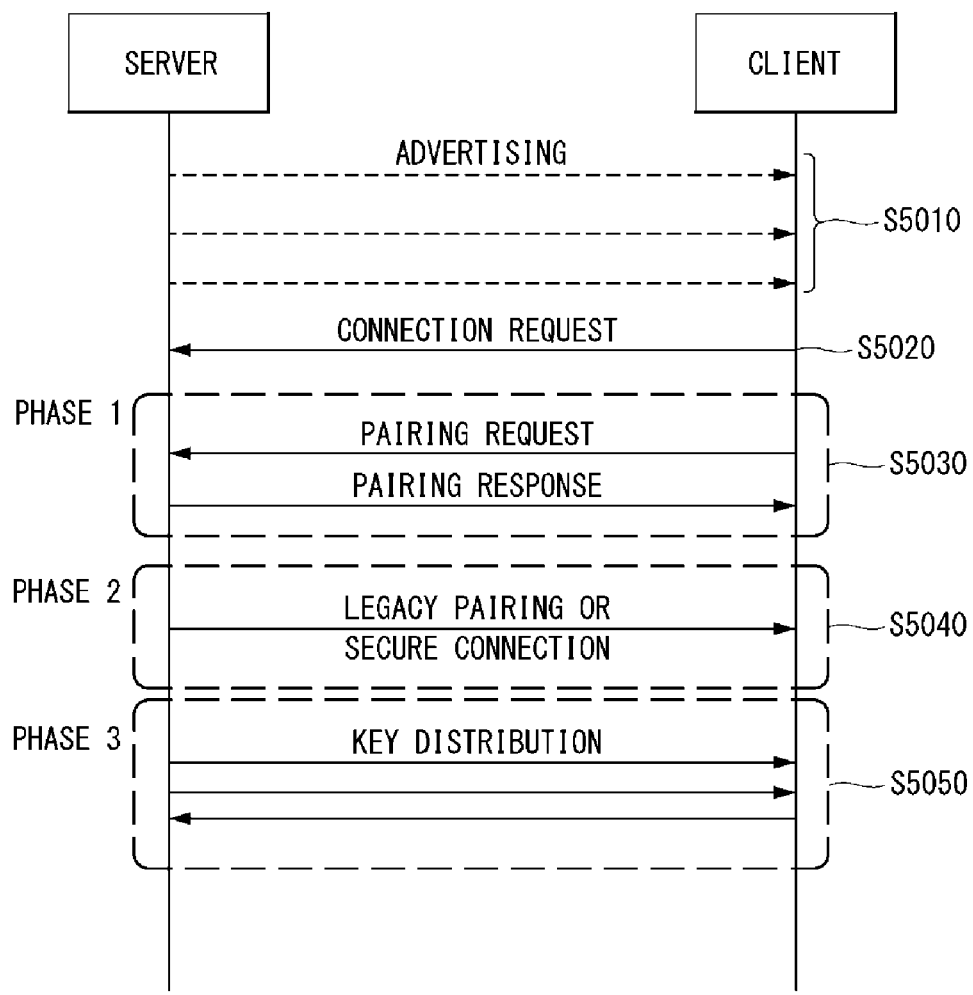

[FIG. 6]
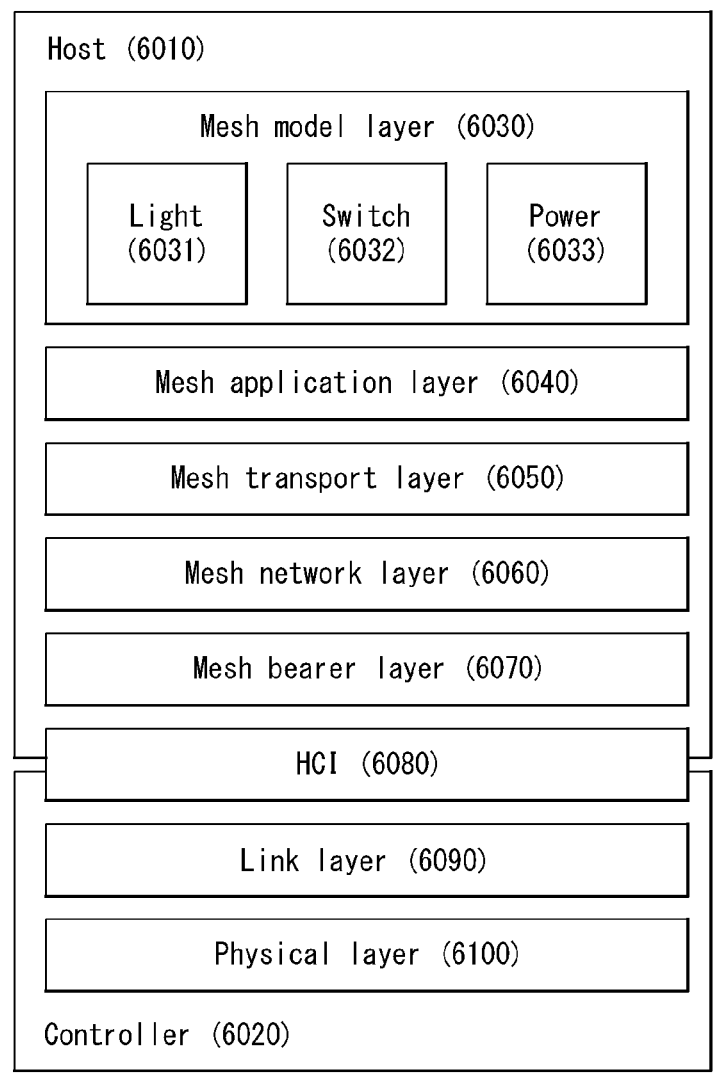

[FIG. 7]
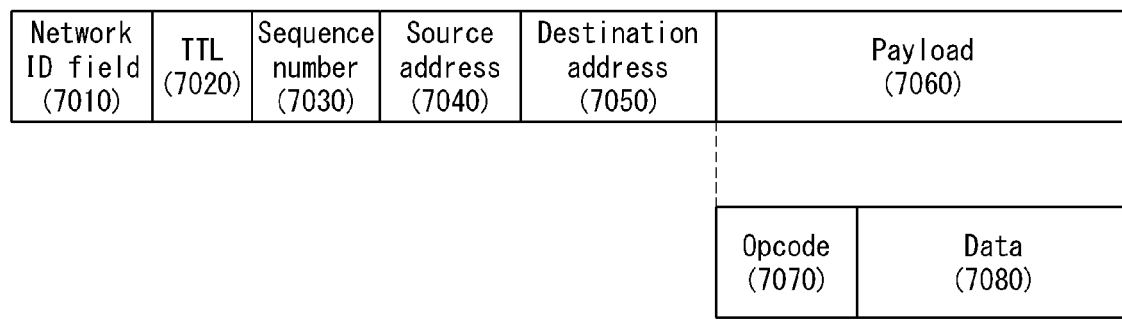

[FIG. 8]
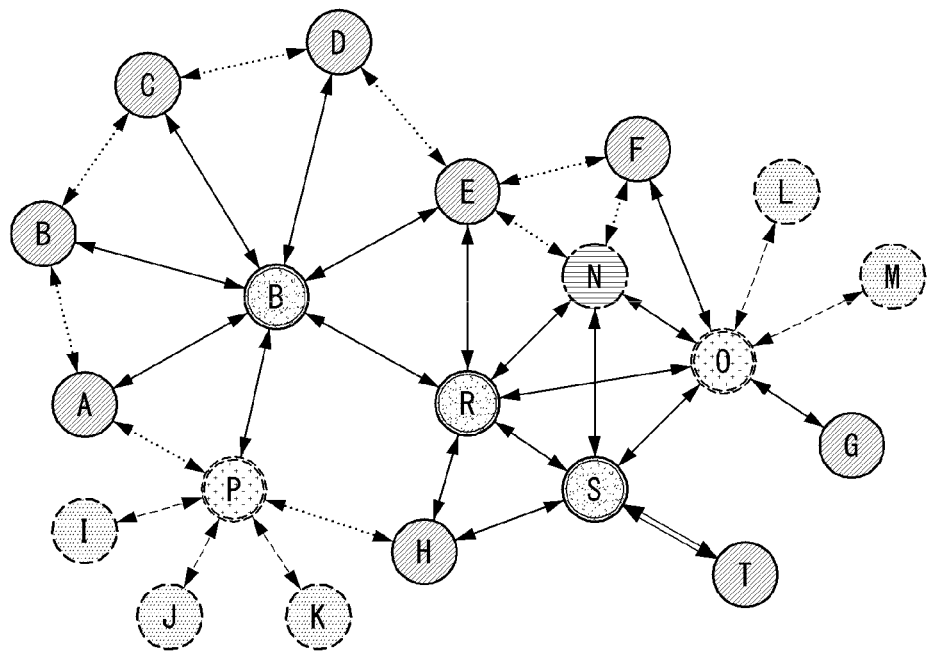
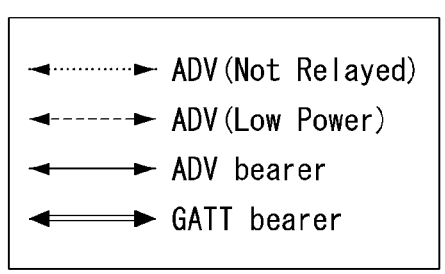
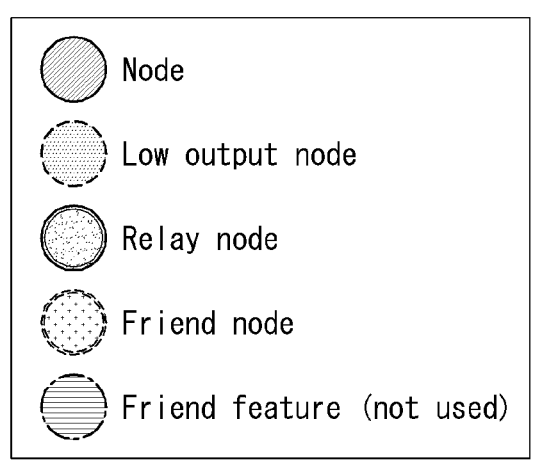

[FIG. 9]
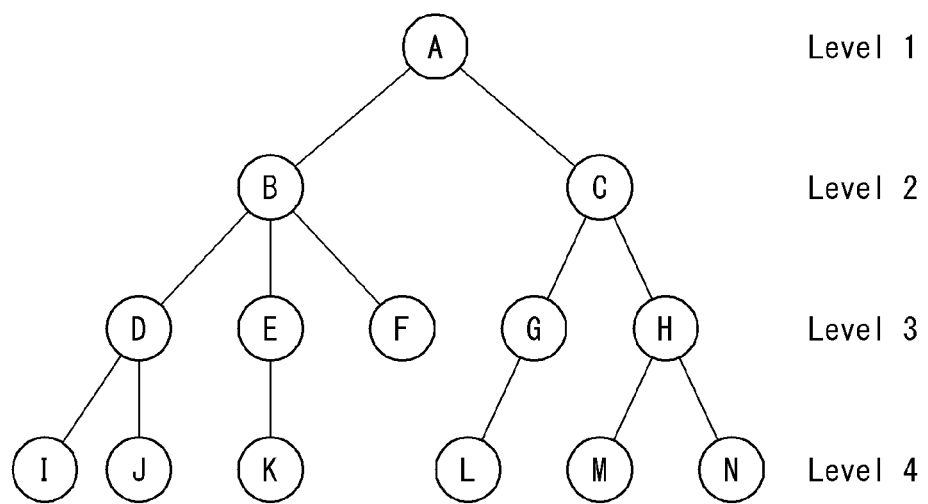

[FIG. 10]
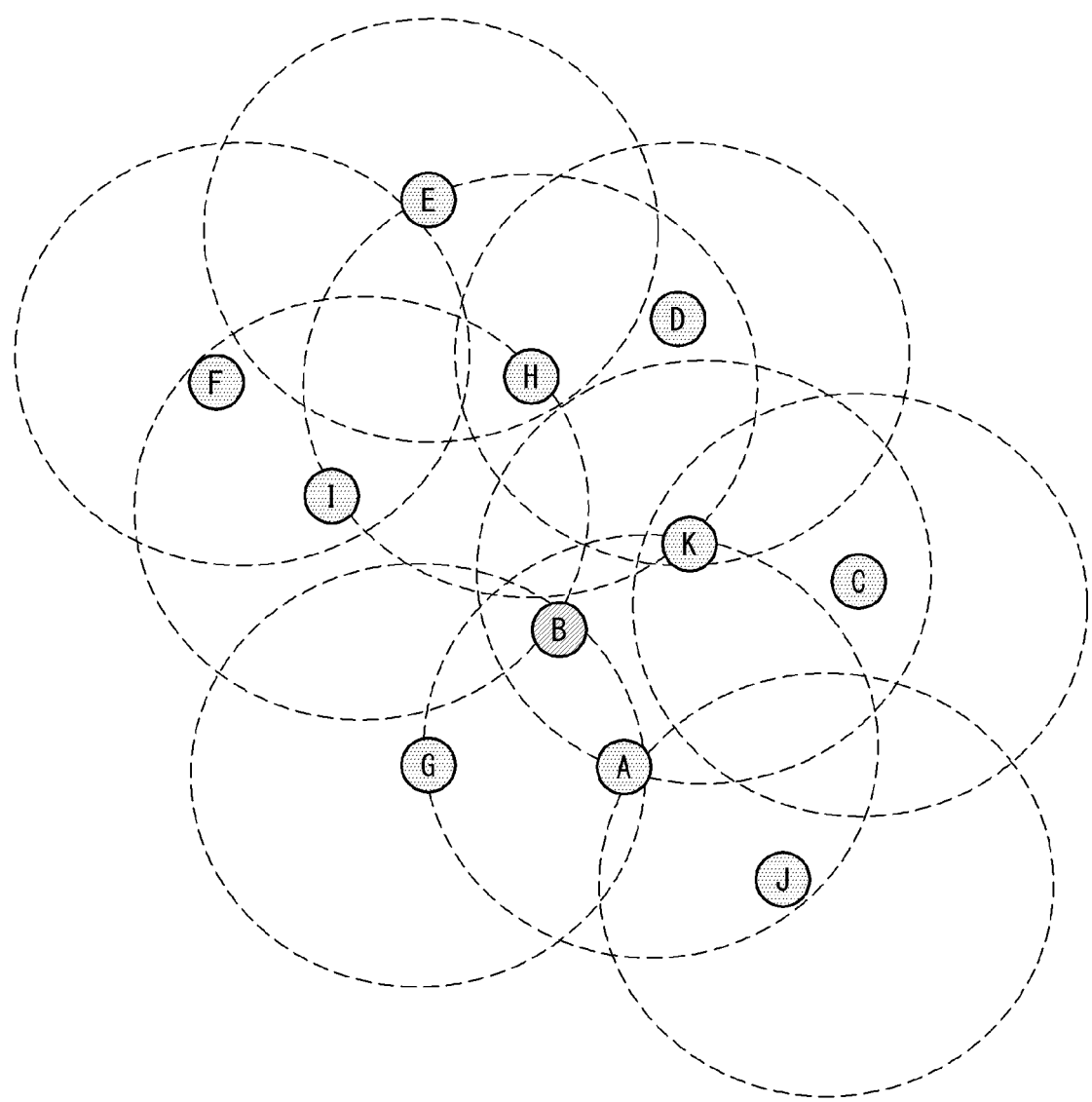

[FIG. 11]
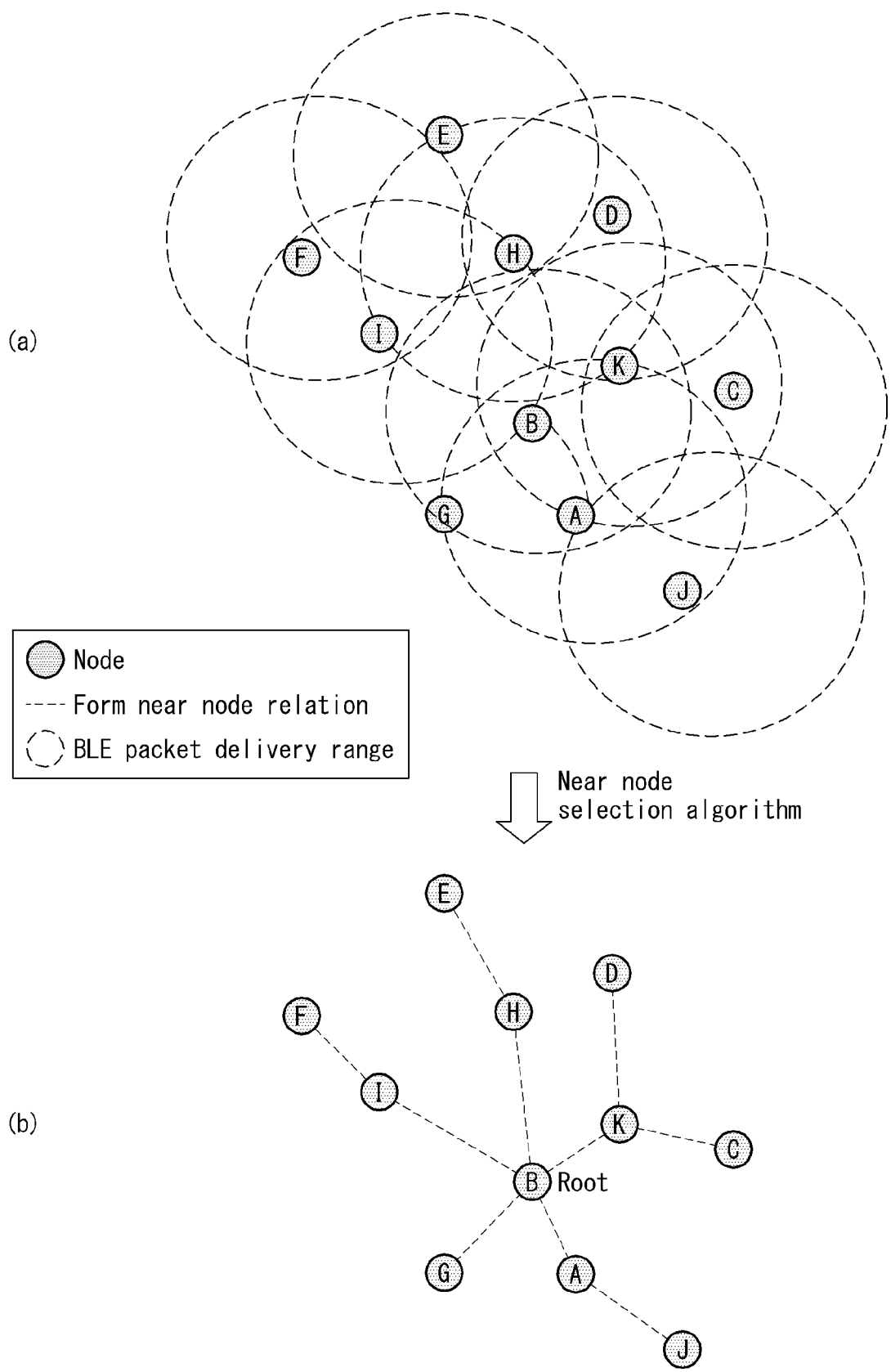

[FIG. 12]
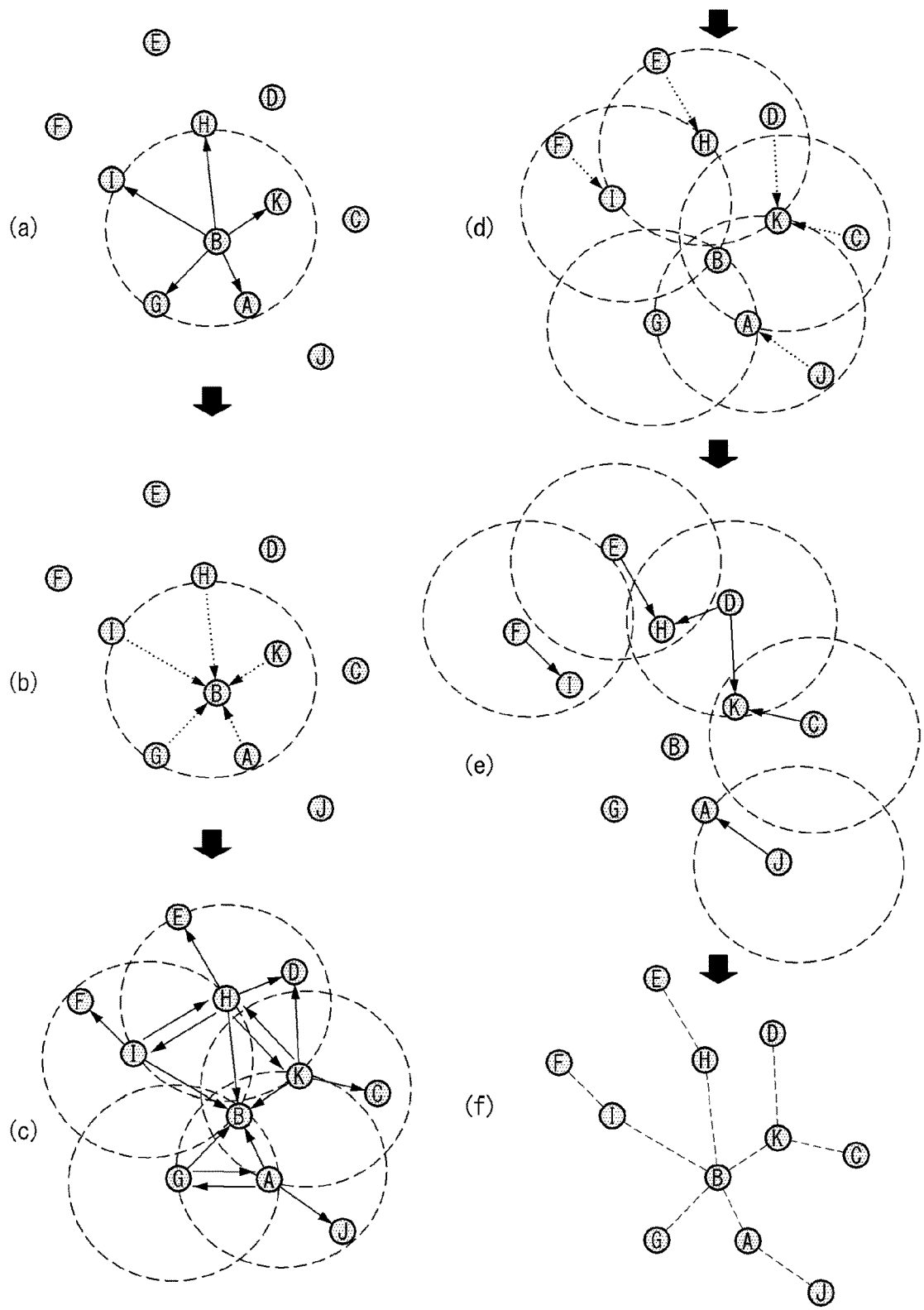
◯ LE packet-receivable area  ● Node  ⟶ FindNearNode packet  ┈▶ SelectNode packet

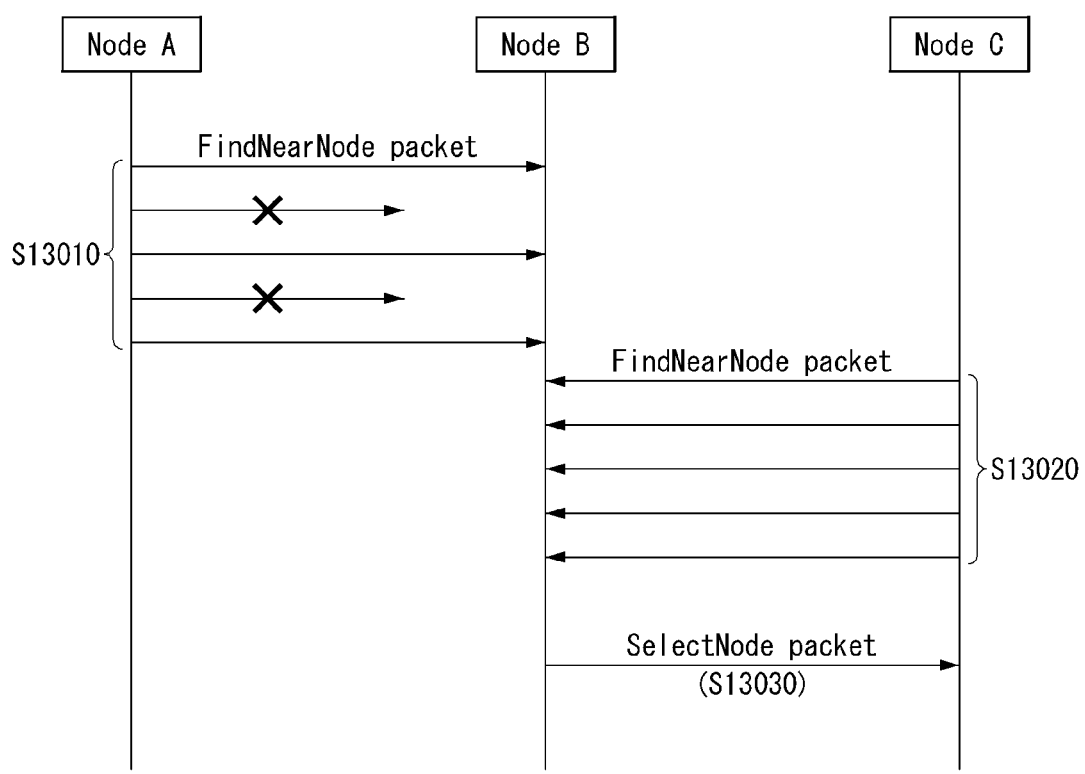
[FIG. 13]

[FIG. 14]
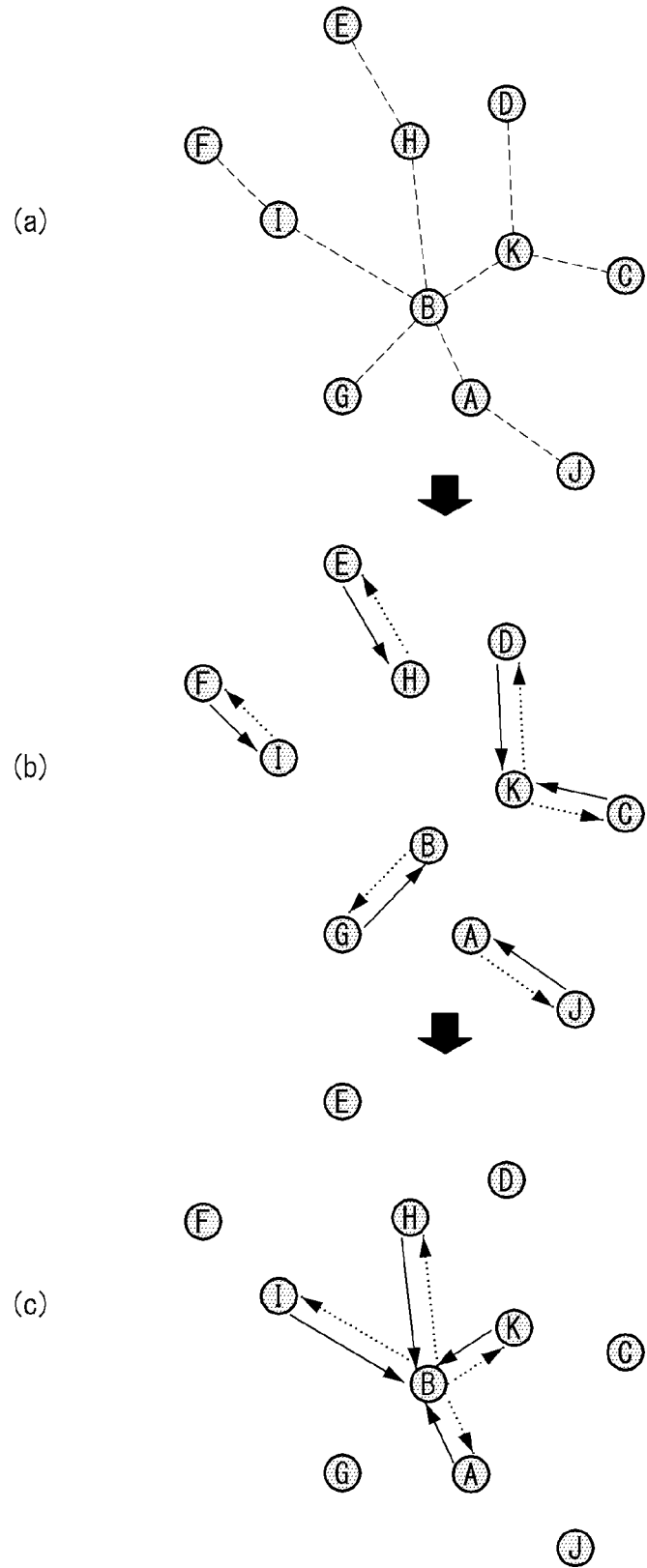

[FIG. 15]
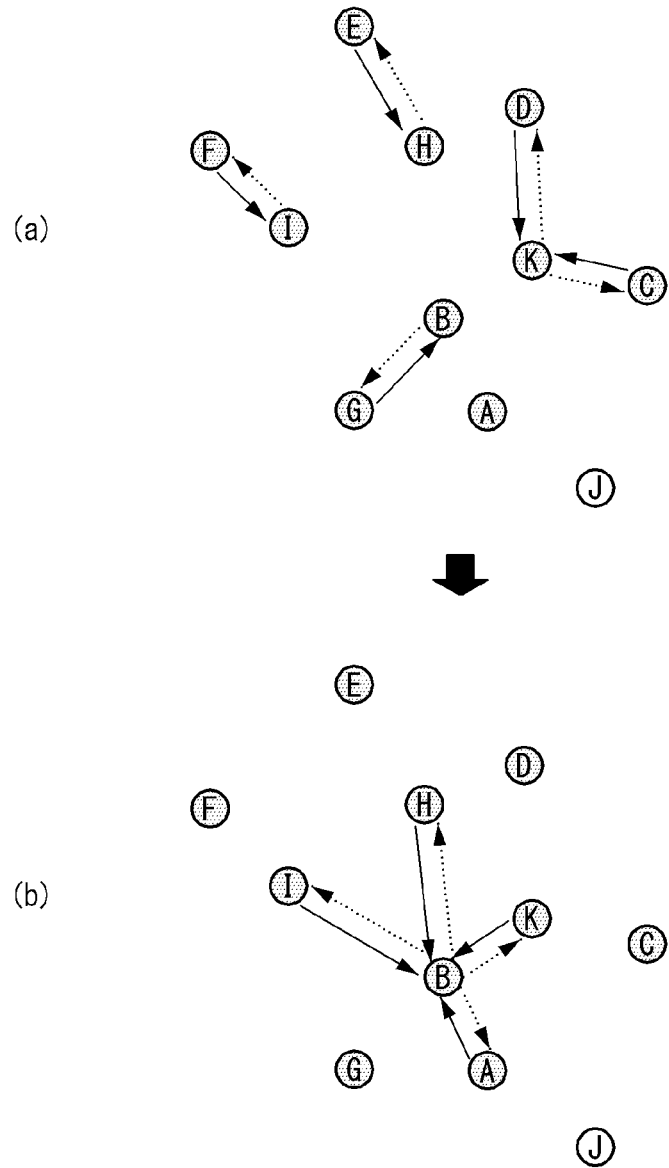

[FIG. 16]
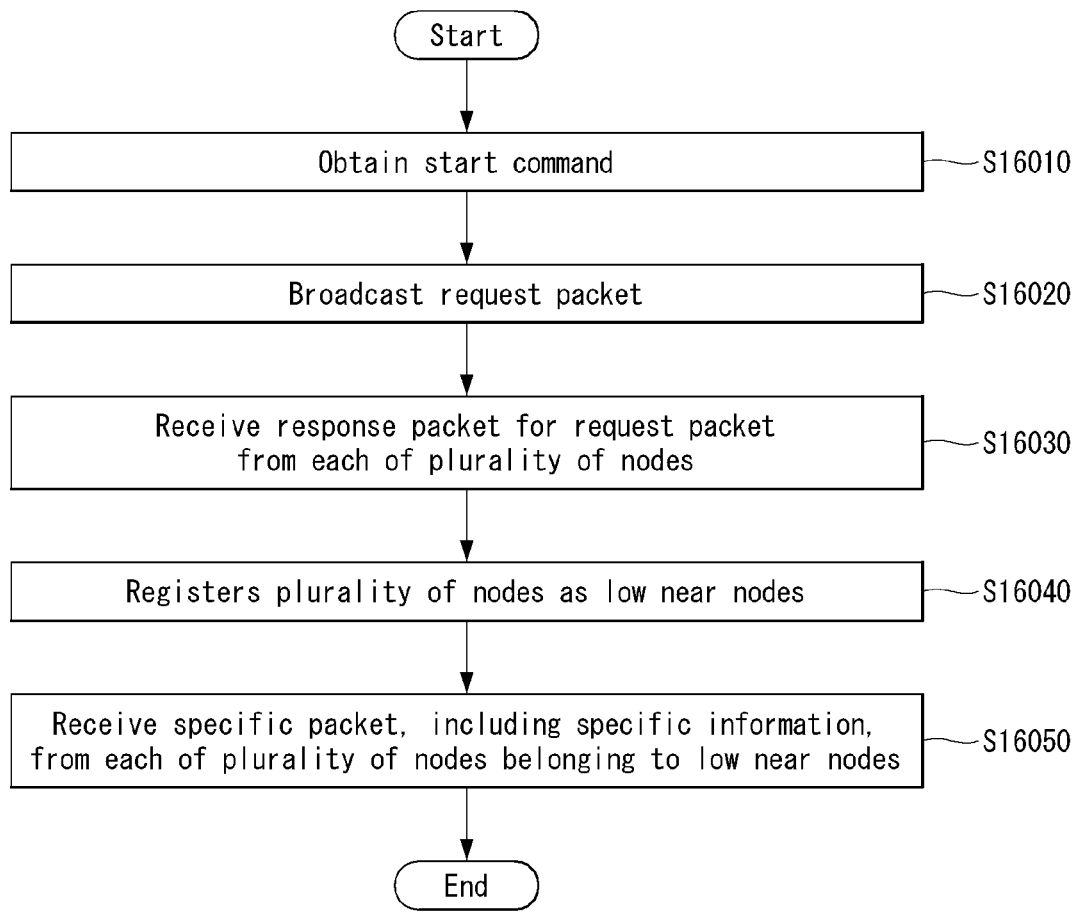

[FIG. 17]
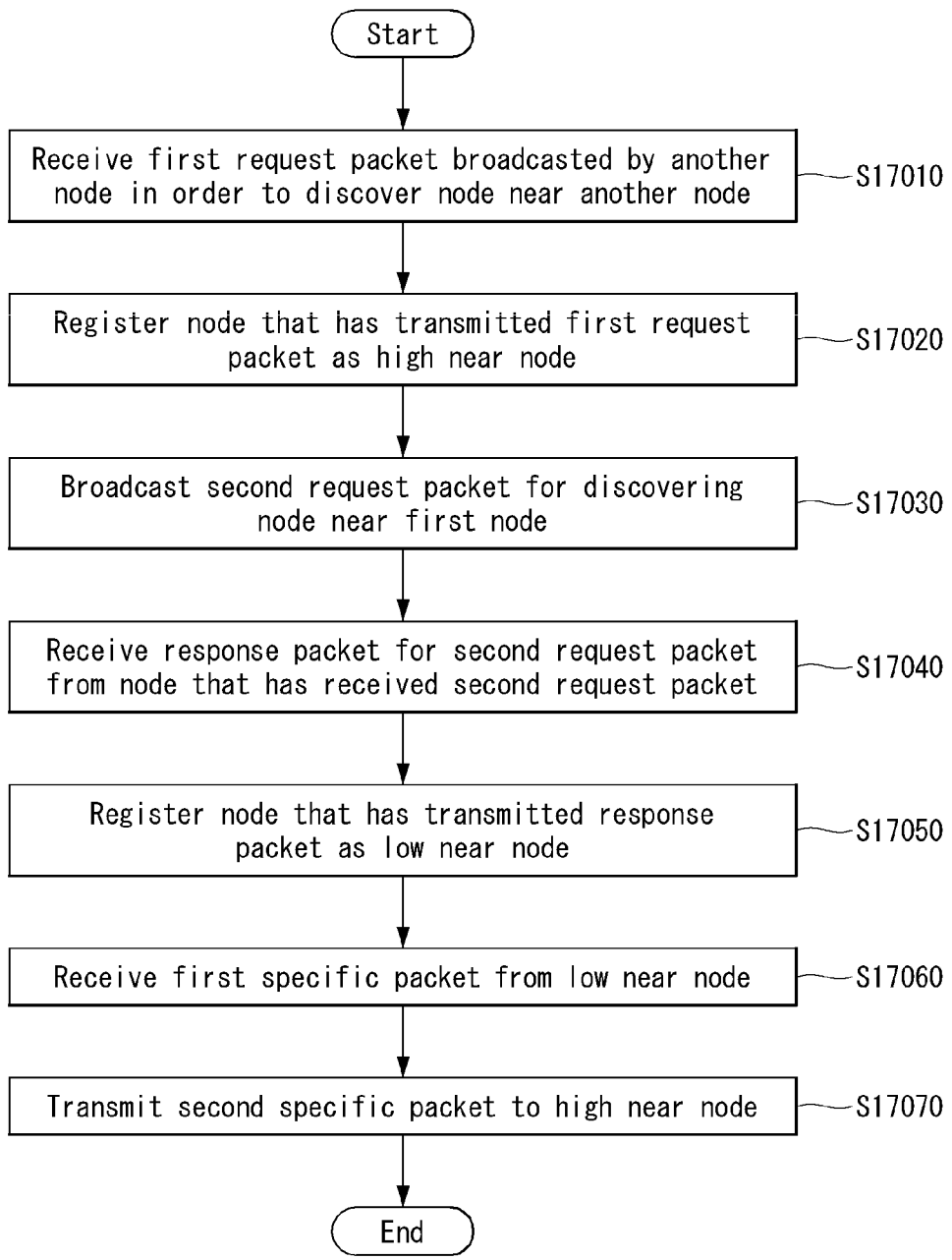

METHOD AND APPARATUS FOR TRANSMITTING AND RECEIVING DATA IN MESH NETWORK USING BLUETOOTH

CROSS REFERENCE TO RELATED APPLICATIONS

This application is the National Phase of PCT International Application No. PCT/KR2017/013639, filed on Nov. 28, 2017, which claims priority under 35 U.S.C. 119(e) to U.S. Provisional Application No. 62/427,122, filed on Nov. 28, 2016, all of which are hereby expressly incorporated by reference into the present application.

TECHNICAL FIELD

The disclosure relates to a method and apparatus for transmitting and receiving data in a mesh network using Bluetooth, that is, a short-distance technology, in a wireless communication system and, more particularly, to a method and apparatus for transmitting and receiving data by configuring a path having a tree structure in a Bluetooth mesh network based on a flooding method.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

The disclosure provides a method and apparatus for transmitting and receiving data in a flooding-based mesh network using a Bluetooth low energy (LE) technology.

Furthermore, the disclosure provides a method and apparatus for forming a path having a tree structure for delivering a specific packet.

Furthermore, the disclosure provides a method and apparatus for selecting a near node in order to form a path having a tree structure.

Furthermore, the disclosure provides a method and apparatus for selecting one of a plurality of near nodes in order to form a path having a tree structure.

Furthermore, the disclosure provides a method and apparatus for obtaining status information of each of nodes through a path having a tree structure.

Furthermore, the disclosure provides a method and apparatus for checking whether abnormality has occurred in some nodes using a specific packet transmitted along a path having a tree structure.

The technical objects of the disclosure are not limited to the aforementioned technical objects, and other technical objects, which are not mentioned above, will be apparently appreciated by a person having ordinary skill in the art from the following description

Technical Solution

In an embodiment of the disclosure, a method of transmitting and receiving, by a first node, data in a Bluetooth mesh network includes obtaining, from a control device controlling the Bluetooth mesh network, a command message indicating a start of a procedure for obtaining specific information of all nodes included in the Bluetooth mesh network, broadcasting a request packet for discovering a node near the first node, receiving a response packet for the request packet from each of a plurality of nodes that has received the request packet, registering the plurality of nodes as low near nodes of the first node, and receiving, from each of the plurality of nodes belonging to the low near nodes, a specific packet including the specific information, wherein the Bluetooth mesh network is based on a flooding method, the low near node is a node that delivers the specific information, and each of the specific packets received by the first node includes the specific information of one or more non-overlapping and different nodes.

Furthermore, in the disclosure, if a second node that has transmitted the specific packet registers its own low near node, the specific packet includes first specific information of the second node and second specific information delivered through a second specific packet from a low near node of the second node.

Furthermore, in the disclosure, the request packet, the response packet, and the specific packet are a 1-hop packet.

Furthermore, in the disclosure, the specific information generated by each node is delivered to the first node through a path of a tree structure in which the first node corresponds to a root node using the specific packet.

Furthermore, the disclosure further includes transmitting, by the first node, a message including the specific information of the first node and the specific information of other nodes included in the received specific packet, to the control device.

Furthermore, in the disclosure, the specific information is status information indicating a current status of the node.

Furthermore, in the disclosure, the specific packet is periodically generated and transmitted by each of the nodes included in the Bluetooth mesh network in order to notify that the node has been activated.

Furthermore, in the disclosure, registering the plurality of nodes as the low near nodes includes registering the plurality of nodes as the low near nodes only if the response packet is received by the first node within a preset time.

In an embodiment of the disclosure, a method of transmitting and receiving, by a first node, data in a Bluetooth mesh network includes receiving a first request packet broadcasted by another node included in the Bluetooth mesh network in order to discover a node near the another node, registering, as a high near node, the node that has transmitted the first request packet, broadcasting a second request packet for discovering a node near the first node, receiving a response packet for the second request packet from a node that has received the second request packet if the second request packet is transmitted to a near node, registering, as a low near node, the node that has transmitted the response packet, receiving, from the low near node, a first specific packet including first specific information, and generating a second specific packet and transmitting the second specific packet to the high near node, wherein the high near node is a destination node of the second specific packet, the low near node is a node delivering the specific information, and the second specific packet includes the first specific information and the second specific information of the first node.

Furthermore, in the disclosure, receiving the first request packet further includes selecting one of a plurality of near nodes if the first node receives a plurality of different request packets broadcasted by the plurality of near nodes, respectively, In registering, as the high near node, the node, the selected one node is registered as the high near node.

Furthermore, in the disclosure, selecting the one node includes selecting, as the one node, a node that has transmitted a request packet first received by the first node among the plurality of different request packets.

Furthermore, in the disclosure, selecting the one node includes selecting the one node based on a number of times that the request packet has been repeatedly broadcasted and a ratio that the request packet is received by the first node if the request packet is repeatedly broadcasted as many as a pre-defined number during a preset time.

Furthermore, in the disclosure, selecting the one node includes selecting, as the one node, a node that has transmitted a packet having strongest received signal intensity among the plurality of received different request packets.

In an embodiment of the disclosure, in a first node transmitting and receiving data in a Bluetooth mesh network, the first node includes a communication unit configured to communicate with an outside in a wireless or wired manner and a processor functionally connected to a communication unit, wherein the processor is configured to obtain, from a control device controlling the Bluetooth mesh network, a command message indicating a start of a procedure for obtaining specific information of all nodes included in the Bluetooth mesh network, broadcast a request packet for discovering a node near the first node, receive a response packet for the request packet from each of a plurality of nodes that has received the request packet, register the plurality of nodes as low near nodes of the first node, and receive, from each of the plurality of nodes belonging to the low near nodes, a specific packet including the specific information. The Bluetooth mesh network is based on a flooding method, the low near node is a node delivering the specific information to a node that has transmitted the request packet to the low near node using the specific packet, and each of the received specific packets includes the specific information of one or more non-overlapping and different nodes.

Advantageous Effects

According to the method for transmitting and receiving data in the Bluetooth mesh network based on a flooding method according to an embodiment of the disclosure, there is an effect in that data of all nodes can be obtained without a sudden increase in network traffic.

Furthermore, according to the disclosure, delay can be prevented because each of nodes delivers a specific packet to only a predetermined near node.

Furthermore, according to the disclosure, there is an effect in that a nearer one of a plurality of near nodes can be selected in a process of forming a path having a tree structure.

Furthermore, according to the disclosure, there is an effect in that a root node can obtain information of all other nodes because specific packet is delivered to the root node through a path having a tree structure.

Furthermore, according to the disclosure, there are effects in that status check can be periodically performed and a specific node in which abnormality has occurred can be identified because each node periodically transmits a status packet through a path.

Technical objects of the disclosure are not limited to the above-described technical objects, and other technical objects not described above may be evidently understood by those skilled in the art to which the disclosure pertains from the following description.

DESCRIPTION OF DRAWINGS

FIG. 1 is a schematic view illustrating an example of a wireless communication system using a Bluetooth low energy technology to which the disclosure is applicable.

FIG. 2 illustrates an example of an internal block diagram of a device capable of implementing methods proposed by the disclosure.

FIG. 3 illustrates an example of a Bluetooth communication architecture to which methods proposed by the disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the disclosure may be applied.

FIG. 6 illustrates Bluetooth mesh architecture according to an embodiment of the disclosure.

FIG. 7 illustrates a packet format used in a Bluetooth mesh network according to an embodiment of the disclosure.

FIG. 8 illustrates a Bluetooth mesh network topology according to an embodiment of the disclosure.

FIG. 9 illustrates a tree structure according to an embodiment of the disclosure.

FIG. 10 illustrates a data delivery method based on a flooding method in a Bluetooth mesh network according to an embodiment of the disclosure.

FIG. 11 illustrates that a path having a tree structure has been formed through an algorithm for selecting a near node in a Bluetooth mesh network according to an embodiment of the disclosure.

FIG. 12 illustrates a detailed process of an algorithm for selecting a near node in a Bluetooth mesh network according to an embodiment of the disclosure.

FIG. 13 illustrates that one node receives FindNearNode packets from a plurality of surrounding nodes and transmits a SelectNode packet to one node selected from the surrounding nodes in a Bluetooth mesh network according to an embodiment of the disclosure.

FIG. 14 illustrates a method of transmitting the status of each of nodes through a path after the path having a tree structure is formed in a Bluetooth mesh network according to an embodiment of the disclosure.

FIG. 15 illustrates a method of checking abnormality occurred in some nodes after the transmission path of a specific packet is formed through a near node selection algorithm in a Bluetooth mesh network according to an embodiment of the disclosure.

FIG. 16 illustrates a flowchart of a process of obtaining, by a root node, specific information of other nodes using a specific packet in a Bluetooth mesh network according to an embodiment of the disclosure.

FIG. 17 illustrates a flowchart of a process of transmitting, by a node other than a root node, specific information to a high near node using a specific packet in a Bluetooth mesh network according to an embodiment of the disclosure.

MODE FOR INVENTION

In order to help understanding of the disclosure, the accompanying drawings which are included as a part of the Detailed Description provide embodiments of the disclosure and describe the technical features of the disclosure together with the Detailed Description. Like reference numerals principally designate like elements throughout the disclosure. Further, in describing the disclosure, a detailed explanation of known related technologies may be omitted to avoid unnecessarily obscuring the subject matter of the disclosure. Further, it is noted that the accompanying drawings are only for easily understanding the spirit of the disclosure and it should not be interpreted that the spirit of the disclosure is limited by the accompanying drawings.

Hereinafter, a method and an apparatus related with the disclosure will be described in more detail with reference to drawings. In addition, a general term used in the disclosure should be interpreted as defined in a dictionary or contextually, and should not be interpreted as an excessively reduced meaning. Further, a singular form used in the disclosure may include a plural form if there is no clearly opposite meaning in the context. In the present application, a term such as "comprising" or "including" should not be interpreted as necessarily including all various components or various steps disclosed in the disclosure, and it should be interpreted that some component or some steps among them may not be included or additional components or steps may be further included. Suffixes "unit", "module", and "section" for components used in the following description are given or mixed in consideration of easy preparation of the disclosure only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display or receive a request input from the user through a user input interface in the process of transmitting and receiving the notice, indication, and confirm messages to and from the client device.

In addition, the server device may read data from a memory or write new data in the corresponding memory in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display or receive an input from the user through the user input interface in the process of transmitting and receiving the messages to and from the server device.

In addition, the client device may read data from the memory or write new data in the corresponding memory in the process of transmitting and receiving the message to and from the server device.

Hardware components such as the display, the user input interface, and the memory of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the disclosure.

As shown in FIG. 2, the server device 110 includes a display 111, a user input interface 112, a power supply unit 113, a processor (or controller) 114, a memory 115, a Bluetooth interface 116, another interface 117, and a communication unit (or transceiver) 118.

The display 111, user input interface 112, power supply unit 113, processor 114, memory 115, Bluetooth interface 116, another interface 117, and communication unit 118 are functionally interconnected so as to perform a method according to an embodiment of the disclosure.

Furthermore, the client device 120 includes a display 121, a user input interface 122, a power supply unit 123, a processor 124, a memory 125, a Bluetooth interface 126, and a communication unit (or transceiver) 127.

The display 121, user input interface 122, power supply unit 123, processor 124, memory 125, Bluetooth interface 126, and communication unit 127 are functionally interconnected so as to perform a method according to an embodiment of the disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertising message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memories 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory and executed by the processor.

The memorys 115 and 125 may be positioned inside or outside the processors 114 and 124 and connected with the processors 114 and 124 by various well-known means.

The displays 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption can be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices can scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, that is, an initiating device, transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. A only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, that is, a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type filed of an advertising channel included in the header supports PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure.

The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute

Type: Type of attribute

Value: Value of attribute

Permission: Access authority to attribute

FIG. 5 is a flowchart showing an example of a connection procedure method in Bluetooth low power energy technology to which the disclosure may be applied.

A server transmits to a client an advertising message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smart phone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertising message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK

Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

FIG. 6 illustrates Bluetooth mesh architecture according to an embodiment of the disclosure.

In the disclosure, a "node" refers to a device configuring a mesh network. A node and a device may be interchangeably used. Furthermore, a packet and a message may be interchangeably used.

A Bluetooth mesh network refers to a network over which multiple devices are connected through Bluetooth like a mesh and can transmit and receive data.

As shown in FIG. 6, a Bluetooth mesh system includes a controller stack 6020 capable of operating to process a radio device interface and a host stack 6010 capable of operating to process high-level data.

Furthermore, although not illustrated in FIG. 6, a Bluetooth low energy (LE) layer is present at the bottom of the stack of the Bluetooth mesh structure. The Bluetooth LE layer includes all Bluetooth LE stacks not a single layer. A Basic wireless communication function is secured through the Bluetooth LE layer. That is, the Bluetooth mesh system is based on Bluetooth LE. The controller stack 6020 illustrated in FIG. 6 may be included in the Bluetooth LE layer.

In order to avoid a configuration with the description of FIG. 3, hereinafter, the host stack of the Bluetooth mesh system is referred to as a mesh host stack, and the controller stack of the Bluetooth mesh system is referred to as a mesh controller stack.

The mesh controller stack 6020 includes a physical layer 6100, a link layer 6090 and a host controller interface (HCI) 6080. The mesh controller stack 6020 may be implemented using a communication module capable of including a Bluetooth radio apparatus and a processor module. For example, the mesh controller stack 6020 may be implemented using a wireless transceiver module for receiving a Bluetooth signal of 2.4 GHz and hardware for transmitting and receiving a Bluetooth packet.

The physical layer (wireless transceiver module) 6100 is a layer for transmitting and receiving 2.4 GHz radio signals, and uses Gaussian frequency shift keying (GFSK) modulation and a frequency hopping scheme configured with 40 RF channels.

The link layer 6090 performs advertising and scanning functions using 3 advertising channels. Thereafter, the link layer 6090 generates a connection between devices, and provides a function for exchanging data packets having a maximum of 42 bytes through 37 data channels.

The HCI 6080 provides an interface between the mesh host stack 6010 and the mesh controller stack 6020. The HCI 6080 enables the mesh host stack 6010 to provide a command and data to the mesh controller stack 6020, and enables the mesh controller stack 6020 to provide an event and data to the mesh host stack 6010.

The mesh host stack 6010 includes a mesh model layer 6030, a mesh application layer 6040, a mesh transport layer 6050, a mesh network layer 6060 and a mesh bearer layer 6070.

The mesh bearer layer 6070 defines a method of transmitting a message/packet between nodes based on the physical layer and the link layer of Bluetooth. Specifically, the mesh bearer layer 6070 defines how a mesh PDU is handled within a given communication system.

An advertising bearer and a GATT bearer have been defined as the mesh bearer layer 6070. The advertising bearer delivers a mesh PDU using the GAP advertising function and scanning function of Bluetooth LE. The GATT bearer enables a device, which does not support an advertising bearer, to be indirectly connected to a node within a mesh network using a proxy protocol. In addition, other bearers may be additionally defined.

The mesh network layer 6060 provides a network function to mesh packets delivered through the mesh bearer layer 6070. Specifically, the mesh network layer 6060 defines a method of a transport message being directed toward one or more elements. The elements are described later in detail. The mesh network layer 6060 defines various message address types and network message formats, so a mesh transport layer PDU can be transmitted by the mesh bearer layer 6070. The mesh network layer 6060 determines whether to relay (or intermediate) a message and whether to accept or reject a message for additional processing. Furthermore, the mesh network layer 6060 defines a method of ciphering and authenticating a network message.

The mesh transport layer 6050 defines a ciphering and authentication function for the end-to-end transmission of a mesh. The mesh transport layer 6050 includes a lower transport layer and an upper transport layer.

A lower transport layer receives a PDU from an upper transport layer and delivers the PDU to the lower transport layer of a peer device. The lower transport layer of the peer device that has received the PDU delivers the received PDU to an upper transport layer. In this case, the lower transport layer splits the PDU in a proper length and assembles the splits PDU, if necessary.

An upper transport layer performs the ciphering, deciphering and authentication of application information transmitted to an access layer or received by the access layer. Furthermore, the upper transport layer is responsible for a transport control message that is internally generated and transmitted to the upper transport layer. The transport control message includes a message related to a friendship or heartbeat.

The mesh application layer 6040 defines the application function of a Bluetooth mesh.

The mesh model layer 6030 is responsible for the implementation of a model and the implementation of a behavior, message, status, status binding, and other things defined in model specifications. For example, the mesh model layer may include a light 6031, a switch 6032 and/or power 6033.

FIG. 7 illustrates a packet format used in a Bluetooth mesh network according to an embodiment of the disclosure.

Hereinafter, a packet used in a Bluetooth mesh network is referred to as a mesh packet or a packet.

Referring to FIG. 7, the mesh packet includes a network ID field 7010, a time to live (TTL) field 7020, a sequence number field 7030, a source address field 7040, a destination address field 7050, and a payload field 7060. The payload field 7060 includes an Opcode field 7070 and a data field 7080.

The network ID field 7010 includes information (i.e., network ID) for identifying a Bluetooth mesh network. A value of the network ID field 7010 may be derived from the network key of a mesh. The key of a network may be denoted as a netkey. All nodes within a mesh network may share a network key. Accordingly, nodes belonging to the same mesh network may generate packets having the same network ID.

The TTL field 7020 includes hop number information on which a packet may be relayed. A TTL value may indicate whether a packet has been relayed and transmitted and/or whether the packet can be subsequently relayed. The TTL value is an integer value and is decreased whenever the packet is relayed. For example, if a TTL value is 3, a message may be relayed by a maximum of 3 hops. A message having a TTL value of 0 is not relayed and may be moved by 1 hop. An initial value of the TTL field 7020 may be set by a transport layer or an application program. A hop, a relay node and relay are described later in more detail.

The sequence number field 7030 includes sequence number information designed for protection against replay attacks chiefly. A sequence number may be set as a serial number of an element by a mesh network layer. The sequence number may increase one by one every new network PDU.

The source address field 7040 includes information to identify a node that has generated a packet. That is, the source address field 7040 includes address information of a source node that has generated a packet. The source address is a unicast address. The unicast address is an address for identifying a single element. The source address field 7040 is untouched by a node operating as a relay node.

The destination address field 7050 includes information to identify a node that needs to receive a packet (or node toward which a packet is directed). A destination address is a unicast address, group address or virtual address. The group address is a multicast address indicating a single element or a plurality of elements. One virtual address may be allocated to a single or a plurality of elements and functions as a kind of label. Furthermore, the destination address may be a broadcast address.

A Bluetooth mesh network defines multiple message types. Each of messages have a unique Opcode for each type.

FIG. 8 illustrates a Bluetooth mesh network topology according to an embodiment of the disclosure.

In general, a Bluetooth LE device enables a device to device using a point-to-point network structure. The connection is called a "piconet" in the Bluetooth core spec. In contrast, a Bluetooth mesh network forms a many-to-many network structure. That is, all devices configuring a mesh may communicate with each other. If a device relays a message to another device, an end-to-end range may be expanded.

A node means a device included in a mesh network. A device not included in the mesh network is referred to as an unprovisioned device. A node may be configured with one or more components called an element. Each element may be independently controlled.

Provisioning is a procedure for changing an unprovisioned device to a node. A provisioner means a device used for provisioning. For example, provisioning may be performed through an application installed in a smart device (smartphone or tablet). In this case, the smart device corresponds to a provisioner. Provisioning is a procedure whose security is maintained in itself.

A low power node is a node not having restriction on power use. A low power node cooperates with another node not having restriction on power use. A low power node maintains a sleep status at normal times and may wake up by an interaction or may periodically wake up. A low power node may process a received message if the received message satisfies a specific condition.

A friend node corresponds to a node that cooperates with a low power node. The friend node has no restriction on power use. For example, a node connected to a permanent AC power source may be designated as a friend node. The friend node stores a message transmitted to a low power node, and delivers the stored message when the low power node subsequently requests message transmission. The friend node and the low power node are present within a single hop distance. A relation between the low power node and the friend node is defined as a friendship. The friendship enables a Bluetooth mesh network to operate in a power efficient manner.

In the disclosure, a hop indicates a link between devices in a Bluetooth mesh network. That is, a link formed between a source node and a relay node, between a relay node and a relay node, between a relay node and a destination node, and between a source node and a destination node may be called a hop.

A Bluetooth mesh network includes several nodes for relaying (or intermediating) a message between a source device that transmits data and a destination device that receives the data. A relay node is a node having a relay function (function for enabling a node to relay a message). The relay node may retransmit a received message if a specific condition is satisfied. A relay enables a message to traverse the entire mesh network. The number of hops of a message may be limited based on a TTL value of the TTL field. For example, if a TTL value is 3, a message may be relayed by a maximum of 3 hops.

A mesh network disclosed in FIG. 8 includes 9 nodes A, B, C, D, E, F, G, H and T, 5 low power nodes I, J, K, L and M, 3 relay nodes Q, R and S, 2 friend nodes Q and P, and one friend feature (not used) node N.

The node P is a friend node of the nodes I, J and K. The node O is a friend node of the nodes L and M. The node N does not have a friendship unlike the node P and the node O. Accordingly, only the node P and the node O are friend nodes.

The node T is connected to only a mesh network using a GATT bearer. That is, the node T corresponds to a Bluetooth device that has owned a Bluetooth LE stack, but does not own a Bluetooth mesh stack. For example, if a message needs to be transmitted from the node T to the node L, the node T transmits the message to the node S using a GATT bearer. Thereafter, the node S retransmits the received message using an advertising (ADV) bearer. The nodes H, R, N and O receive the message because they are within the radio range of the node S. The node O stores the message and subsequently delivers the message to the node L.

FIG. 9 illustrates a tree structure according to an embodiment of the disclosure.

The disclosure uses the concept of a tree structure described hereinafter.

In a Bluetooth mesh network, a node indicates a Bluetooth device included in a mesh. In the description regarding FIG. 9, however, a node of a tree structure has only a meaning as an element of the tree structure. However, in a Bluetooth mesh network, if a relation has been formed between nodes (devices) in a tree structure, each of the nodes of the tree structure may correspond to a node of a Bluetooth mesh network.

A tree structure (hereinafter denoted as a tree for convenience sake) is a set having a plurality of nodes. A tree is an acyclic graph and has a layer structure. A node (or joint) is a basic element configuring a tree.

A root node is a node present at the highest of a tree structure. The root node does not have a parent node. Nodes other than the root node are divided into n subtrees in which elements are not overlapped. A subtree is a small tree belonging to a large tree. Each of nodes has a subtree corresponding to the number of child nodes.

A leaf node (or terminal node) is a node not having a child node. The degree of a leaf node is 0. A branch node refers to a node whose degree is not 0, and is also called a non-terminal node or an internal node.

A parent node is a node having a subtree. A child node is a subnode belonging to a parent node. A leaf node is a node to which another node underneath thereof is not connected. The degree of the leaf node is 0. A sibling node indicates a child node having same parent. The sibling nodes have the same level. An ancestor node indicates a set of parent nodes of one node. A descendant node indicates all nodes in a subtree of one node.

A branch indicates a connection line between a node and a node. The branch may also be denoted as a relation, a link, an edge or bifurcation. A degree indicates the number of subtrees of a node. The degree of a tree is the greatest degree among the degrees of a node. In FIG. 9, the degrees of A and B and G are 2, 3 and 1, respectively, and the degree of a tree is 3.

A level (or standard) indicates a depth from a root node. The depth indicates the level of a node belonging to a tree. The level of a root node is 1. Unlike in FIG. 9, the level of a root node may be represented as 0 according to circumstances. The depth of a tree indicates a maximum level of a node belonging to a tree. A height indicates the number of edges in a path ranging from a root node to a corresponding node. The height of a tree corresponds to the height of a node having a maximum level or the greatest depth value.

A path indicates the sequence of nodes placed in a road ranging from one node to the other node. A path length indicates the number of nodes ranging from a source node to a destination node.

FIG. 9 is an example of a tree structure. In FIG. 9, a tree includes nodes A to N. FIG. 9 is a tree in which the level of a root node is 1. The root node is A, and leaf nodes are F, I, J, K, L, M and N. The child nodes of A are B and C. The parent node of F is B. D, E and F are sibling nodes. The ancestor nodes of K are A, B and E. The descendant nodes of C are G, H, L, M and N. The degree of A is 2, the degree of B is 3, and the degree of M is 0. The degree of the tree is 3. The height of G is 2. The height of the tree is 3. The depth of D is 3. The level of D, E, F, G and H is 3.

FIG. 10 illustrates a data delivery method based on a flooding method in a Bluetooth mesh network according to an embodiment of the disclosure.

A data transmission method of a Bluetooth mesh network may be divided into a flooding method and a routing method depending on an operation in a relay node. Data is transmitted from a source node to a destination node via several relay nodes based on the flooding method or the routing method.

The routing method is a method in which a source node transmits a message to a specific relay node and thereafter, the specific relay node has information of another relay node or destination node to which the message will be retransmitted and transmits the packet. The routing method uses a broadcasting channel or point-to-point connection method for the reception and retransmission of messages. The routing method has an advantage in that a radio wave resource can be reduced compared to the flooding method. However, the routing method has disadvantages in that the complexity of an implementation is great and path information must be exchanged between relay nodes in order to construct a routing table.

The flooding method is a method in which a relay node that receives a message shoots the message into the air again using the property that radio waves are spread into the air in all directions. A source node transmits a message to relay nodes through a broadcast channel. The relay nodes that have received the message transmit the message to near relay nodes again, so that message is transmitted to a destination node. The flooding method uses a broadcasting channel for the reception and retransmission of messages, and can expand the transmission range of a message.

The flooding method-based mesh network is a dynamic network. A device may receive a message and transmit (or retransmit) the message at any time if the density of devices is satisfied.

The flooding method has an advantage in that an implementation is easy because a relay node performs only an operation of receiving radio waves and transmitting them again. Furthermore, in the flooding method, a message may be transmitted without constructing a routing table unlike in the routing method. The flooding method has a system and control structure having low complexity, but has a disadvantage in that overall network traffic is increase due to the property that all relay nodes that have received messages retransmit the received messages again.

From FIG. 10, a problem occurring in a specific situation in which each of all nodes must transmit a packet in a flooding method-based Bluetooth mesh network a including multiple nodes may be seen.

In FIG. 10, A to K are nodes included in the mesh network. Each of circular contours having dash lines includes a node at its center, and indicates the range in which a packet transmitted by each node can be delivered. One or more other nodes may be present within the packet transmission range of a specific node. Other nodes may receive a packet transmitted by a specific node, and may relay the received packet according to circumstances. Each node may be included in the packet transmission range of one or more other nodes.

In a specific situation, there may be a case where all nodes need to generate respective specific packets for a specific object and transmit the specific packets. Particularly, there may be a case where all nodes must transmit specific packets at the same time or within a very short time. For example, if the status of a mesh network is checked through a server, all node must generate packets including their own status information and transmit the packets to a server. In this case, since all the nodes generate the packets, the number of packets of a mesh network is increased instantly and suddenly. A sudden increase in the number of packets suddenly decreases performance of a network. Furthermore, if all nodes must periodically generate and transmit specific packets, a problem with a reduction in performance of a mesh network is further increased. For example, if the number of nodes included in a mesh network is N, each of nodes other than a source node and a destination node needs to relay an (N−2) packet. Accordingly, the amount of traffic of the mesh network may increase instantly and suddenly, and delay may occur in packet delivery.

Accordingly, in order to solve such a problem, the disclosure proposes a method of transmitting a specific packet without a sudden increase in network traffic if all nodes must generate respective specific packets for a specific object and transmit the specific packets in a flooding-based Bluetooth mesh network.

Hereinafter, a Bluetooth mesh network to which the disclosure is applied corresponds to a mesh network based on a flooding method. Furthermore, a device (or node) described hereinafter indicates a Bluetooth LE device included in a Bluetooth mesh network.

FIG. 11 illustrates that a path having a tree structure has been formed through an algorithm for selecting a near node in a Bluetooth mesh network according to an embodiment of the disclosure.

In FIG. 11, both mesh networks (a) and (b) are based on a flooding method.

(a) illustrates that a packet generated by each node is transmitted using a common flooding method. In the case of (a), a packet generated by each node may be transmitted to all nodes included in the range in which the packet may be transmitted through a broadcasting method. A packet generated by one node may be transmitted to a plurality of near nodes. A node that has received a packet transmitted by another node may relay the received packet according to circumstances.

(b) illustrates that a path having a tree structure has been formed by applying a near node selection algorithm to the network of (a). The structure disclosed in (b) is a structure having B as a root node, and corresponds to an example of a path. A path having a tree structure may be formed if all nodes must transmit respective specific packets in order to obtain specific information of all the nodes. For example, the specific information may be information indicating the status of a node. The specific packet may be a status packet including status information. A path may be formed through a near node selection algorithm. The near node selection algorithm is described later in detail.

Hereinafter, for convenience sake, a path having a tree structure may be called a path, and a specific packet may be called a packet. Furthermore, in the following tree structure, each node corresponds to a device (node) of a Bluetooth mesh network.

First, a tree structure is described. The highest node of the tree structure is a root node. Specific information generated by each node may be delivered to the root node through a path using a specific packet. The root node may obtain information of each node from the received specific packet, and may transmit the information to the outside of the network. Furthermore, the root node is a node that starts a near node selection algorithm. The root node may be designated as one of nodes within the mesh network by the control device of the mesh network.

A node relatively nearer to the root node may be denoted as a high node. A node relatively distant from the root node may be denoted as a low node. A high node of a specific node based on the specific node corresponds to a parent node or an ancestor node. A low node of a specific node corresponds to a child node or a descendant node. That is, a high node has a lower level than a low node. In (b), a node A is a high node of a node J and is a low node of a node B. The node B is a high node of the node J. A node K is a high node of a node D and a node C. Reference is made to the description of FIG. 9 for detailed contents regarding a node.

The transmission path of a specific packet may be formed through a near node selection algorithm. If specific information is status information of a node, a specific packet corresponds to a status packet. The near node selection algorithm is an algorithm for forming a path for delivering specific information of each node by forming a relation between near nodes based on a flooding method.

Each node other than a root node selects a high near node through a near node selection algorithm. Furthermore, each node may select a low near node. If a node receives a specific packet from a low near node, the node transmits a new specific packet, generated based on the received specific packet, to a high near node. The near node selection algorithm is described later in detail.

A near node indicates a node with which a path/relation for the transmission of a specific packet along with the near node, among surrounding nodes, has been formed. All nodes may have at least one near node. Each node stores information of a near node selected through a near node selection algorithm. Each node transmits a specific packet to a near node (high near node) close to a root node. That is, unlike in (a), each node transmits a specific packet to only a near node with which a relation has been previously formed. A near node of each node is determined by a near node selection algorithm. A straight-line dash line between two nodes indicates that the two nodes have a near node relation. Nodes having a near node relation store mutual information.

A near node includes a high near node and a low near node. A high near node is a node relatively close to a root node among a near node(s) of one node. A high near node is the destination node of a specific packet generated by a current node. The high near node of each node is one in number. A low near node is a node(s) other than a high near node among a near node(s) of one node. A low near node is a node that delivers specific information. That is, a high near node is a high node having a lower level than a low near node. A low near node registered with one node may be one or more. Specific nodes may not register a low near node.

Each node may divisively store near nodes as a high near node or a low near node. The names of a high near node and a low near node may be changed.

A root node forms a path with one or more low near nodes. A leaf node forms a path with one high near node. A leaf node does not have a low near node. An internal node may form a path with one high near node and one or more low near nodes. Specific information of each node is delivered to a root node through a formed path.

In (b), near nodes of a node I are a node F and the node B. The node F is the low near node of the node I. The node B is the root node and is also the high near node of the node I. Leaf nodes F, E, D, K and G do not have a low near node. A node H is the high near node of the node E and is a low near node of the node B.

In (b), a process of transmitting information of each node to the root node is described. The node F generates a packet including its own information and transmits the packet to the node I. The node I obtains the information of the node F using the received packet. Thereafter, the node I transmits, to the node B, a packet including information of the node F and its own information. In this case, address information and data of the transmitted packet may be changed. Packets generated by the nodes C and D are transmitted to the node K. The node K obtains information of the nodes C and D using the received packets. Thereafter, the node K generates a packet including the information of the nodes C, D and K, and transmits the packet to the node B. Through such a method, information of each node is transmitted to the root node. A packet is described later in detail.

As described above, in the disclosure, if specific information of all nodes needs to be obtained, a packet related to the specific information generated by each node may be transmitted to a root node along a predetermined path having a tree structure, such as (b). The root node may obtain information of each node and transmit specific information of all the nodes, including its own information, to the outside. The above-described method has a very small number of packets relayed to collect information of all nodes compared to the method (a). As a result, traffic of a mesh network can be significantly reduced.

FIG. 12 illustrates a detailed process of an algorithm for selecting a near node in a Bluetooth mesh network according to an embodiment of the disclosure.

Referring to FIG. 12, a path having a tree structure for transmitting a specific packet may be formed through a near node selection algorithm ((a) to (f) process). In FIG. 12, nodes A to J are nodes included in one Bluetooth mesh network. Hereinafter, the "nodes" may be omitted and represented as "A to J", for convenience sake.

In the near node selection algorithm, two types of packets are used. i) One type is a packet broadcasted by each node in order to discover a node near each node. ii) The other type is a packet transmitted, as a response, by a node that has received a packet broadcasted to discover a near node from a surrounding node.

Hereinafter, a packet broadcasted by each node in order to discover a node near each node may be denoted as a FindNearNode packet or a request packet.

Furthermore, a packet transmitted as a response to the FindNearNode packet may be denoted as a SelectNode packet or a response packet.

Table 2 below illustrates FindNearNode packet and SelectNode packet formats. In addition, other field may be further included. The name of the packets and fields may be changed.

TABLE 2

| Packet Name | TTL | Source Address | Destination Address | Transport PDU |
|---|---|---|---|---|
| FindNearNode | 1 | Own address | Broadcast | Opcode |
| SelectNode | 1 | Own address | Mesh address of device that has transmitted FindNearNode packet | Opcode |

The FindNearNode packet includes a time to live (TTL) field, a source address field, a destination address field and a transport PDU field. The transport PDU field includes an Opcode to identify the type of packet. Reference is made to the description related to FIG. 7 for a detailed description of the TTL.

The TTL of the FindNearNode packet (request packet) is set to 1. Accordingly, the FindNearNode packet may be delivered by only 1-hop distance. Accordingly, a node that has received the FindNearNode packet cannot relay the received packet. The source address is set as its own address. That is, the source address is set as the mesh address of a node that has generated the FindNearNode packet. The destination address is set as a broadcast address. The Opcode is set as a specific code indicating that a corresponding packet is a FindNearNode packet. For example, the Opcode may be set as 0x0001.

The TTL of the SelectNode packet (response packet) is set to 1. The SelectNode packet may be delivered by only 1 hop like the FindNearNode packet. The source address is set as its own address. That is, the source address is set as the mesh address of a node that has generated the SelectNode packet. The destination address is set as the mesh address of a node that has transmitted the FindNearNode packet. The SelectNode packet is not broadcasted.

A node that has received the FindNearNode packet obtains address information of a node that has transmitted the FindNearNode packet using the received packet. Thereafter, the node that has received the FindNearNode packet generates and transmits the SelectNode packet having the obtained address as a destination address.

In this case, the SelectNode packet is transmitted only if a path from a current node to a root node has not yet been formed. A node having a path formed therein may be understood as a node that has determined (or selected) a high near node. That is, the SelectNode packet is transmitted in order for a current node to exchange mutual information and to be registered as a near node only if the current node first receives a FindNearNode packet. The exchanged information may be mesh address information. Each node does not transmit a SelectNode packet although it receives a FindNearNode packet after a path is formed.

Hereinafter, an example of a process forming a path using a request packet (FindNearNode packet) and a response packet (SelectNode packet) is described.

(a) illustrates a process for a root node to broadcast a request packet (FindNearNode packet) in order to discover a near node. First, one node included in a mesh network obtains a command message indicative of the start from a device that controls the mesh network. The start command message may be a message indicative of the start of a procedure for obtaining specific information of all nodes or a message indicative of the start of the formation of a path for transmitting a specific packet.

A user may instruct one node (device), included in a mesh, to start using a control device. Thereafter, the node that has obtained the start command generates and broadcasts a request packet in order to discover a near node.

The device controlling a mesh network is an external device, and may correspond to a device that manages the mesh network, a controller, or a device or smart device that performs provisioning. The start command may be transmitted by a server outside the mesh network. One node that has obtained the start command starts to form a path. The node corresponds to the root node (the highest node) of a tree structure.

In FIG. 12, B corresponds to a root node that has obtained a start command. After obtaining the start command, B broadcasts a request packet. H, I, G, A, and K are present within the transmission range of the request packet broadcasted by B. Accordingly, each of H, I, G, A and K may receive the request packet.

(b) illustrates that nodes that have received a request packet (FindNearNode packet) transmit respective response packets (SelectNode packet). As described above, a surrounding node(s) that has first received the request packet transmits the response packet to the node that has transmitted the request packet. Furthermore, the surrounding node(s) that has first received the request packet registers, as a near node, the node that has transmitted the request packet. In this case, the node that has received the request packet registers, as a high near node of near nodes, the node that has transmitted the request packet. The node that has received the response packet registers, as a low near node of the near nodes, the node that has transmitted the response packet. The node may resister the near node by storing a mesh address and/or command code included in the packet. The sequence of the registration and response packet transmission of a near node performed by one node may be changed.

In this case, each node may be configured to register, as a low near node of each node, only a node(s) that has transmitted the response packet which has been reached within a preset time (or timeout). If any response packet is not received within a preset time after a node broadcasts a request packet, the corresponding node may be determined to be a (leaf) node not having a low near node.

A root node may obtain information of a plurality of near nodes. Nodes may exchange mutual information by exchanging a request packet and a response packet, and may resister them as near nodes. The transmission path of a specific packet is formed between a root node and near nodes through the above-described process.

In the process (b), H, I, G, A and K register them as mutual near nodes. Specifically, H, I, G, A and K register, as a (high) near node, B, that is, a node that has transmitted a request packet that has been first received by each of H, I, G, A and K. Thereafter, H, I, G, A and K generate response packets, each one having the address of B as a destination address, and transmits the response packets to B. B registers, as (low) near nodes, H, I, G, A and K that have transmitted the response packets. Accordingly, B and H, I, G, A and K register them as mutual near nodes. The near nodes of B are H, I, G, A and K. In the tree structure, H, I, G, A and K are the child nodes of B and are sibling nodes each other.

(c) illustrates a process of broadcasting, by nodes having a path formed therein, request packets in order to discover a node near the nodes. The process (c) is performed by nodes registered as near nodes of a root node through the process (b).

Each of the nodes H, I, G, A and K registered as the near nodes of the root node generates and broadcasts a request packet for discovering a node near each node (except the root node). The broadcasted request packets are transmitted to nodes within the range in which each of the request packets may be transmitted. In this case, a node that has received the request packet may be a node having a path not yet formed therein, a root node or another near node of a root node having a path already formed therein.

In the process (c), a request packet broadcasted by H is transmitted to E, I, B, K and D. A request packet broadcasted by I is transmitted to F, H and B. A request packet broadcasted by G is transmitted to B and A. A request packet broadcasted by A is transmitted to G, B and J. A request packet broadcasted by K is transmitted to H, B, C and D.

(d) illustrates that some of the nodes that have received the request packets broadcasted in the process (c) transmit response packets.

As described above, a response packet is transmitted by a node(s) that has first received a request packet. A response packet is transmitted to a node that has transmitted a request packet received by each node.

Nodes that have first receive a request packet register, as high near nodes, a node that has transmitted the request packet. Nodes that have receive a response packet (within timeout) register, as low near nodes, a node that has transmitted the response packet. As described above, the sequence of the transmission of a response packet and the sequence of the registration of a near node are not related.

In a near node selection algorithm, a node that has received a request packet several times does not transmit a response packet for a request packet that is received after the first request packet. A node (i.e., node whose high near node has been registered) that has received a response packet, but has a path already formed therein because the node has received a response packet before does not transmit a response packet. A node whose path has already been formed may neglect or delete a received request packet.

In the process (d), C, D, E, F and J are nodes that have first receive a request packet. Accordingly, C, D, E, F and J transmit respective response packets to a node that has transmitted the request packet received by each of C, D, E, F and J. H does not transmit a response packet because it received the request packets from I and K, but has received the request packet before (process (a)).

F transmits a response packet to I. E transmits a response packet to H. C and D transmit response packets to K. J transmits a response packet to A. F registers I as a high near node. I registers F as a low near node. E registers H as a high near node. H registers E as a low near node. C and D register K as respective high near nodes. K registers C and D as receptive low near nodes. J registers A as a high near node. A registers J as a low near node.

(e) illustrates a process of broadcasting, by each of nodes having a path newly formed therein in the process (d), a request packet in order to discover a near node.

As shown in FIG. 12, in a near node selection algorithm, broadcasting and near node registration processes are repeatedly performed. The near node selection algorithm is terminated when all leaf nodes are determined or when a near node relation between all nodes is formed.

In (e), each of C, D, E, F, and J broadcasts a request packet in order to discover a node near each node. The request packet broadcasted by F is transmitted to I. The request packet broadcasted by E is transmitted to H. The request packet broadcasted by D is transmitted to H and K. The request packet broadcasted by C is transmitted to K. The request packet broadcasted by J is transmitted to A.

All the I, H, K and A are not nodes that have first receive request packets. I, H, K and A have received the request packets in the process (a). Accordingly, I, H, K and A do not transmit response packets. All the C, D, E, F, and J do not receive response packets within a preset time. After near nodes of all nodes are determined, a near node selection algorithm.

A process (f) illustrates the final path of a tree structure which has been formed through the processes (a) to (e). A specific packet generated by each node is transmitted to a high near node through the path. A root node obtains information of each node. In one mesh network, the shape of a tree structure may be changed depending on which node is designated as a root node. For a detailed process of transmitting a packet or information through a formed path, reference is made to the description of FIG. 11(b).

In the processes (a) to (e), one node may receive different request packets transmitted by a plurality of surrounding nodes, respectively, at the same time or within a short time. In this case, a node that has received the request packets transmitted by different nodes has to select one of the plurality of nodes as a high near node. This is described hereinafter specifically.

FIG. 13 illustrates that one node receives FindNearNode packets from a plurality of surrounding nodes and transmits a SelectNode packet to one node selected from the surrounding nodes in a Bluetooth mesh network according to an embodiment of the disclosure.

Referring to FIG. 13, one of a plurality of surrounding nodes may be selected as a high near node.

A node that has not yet registered a high near node may receive request packets (FindNearNode packet) transmitted by a plurality of surrounding nodes, respectively, at the same time or within a short time. That is, different request packets generated by a plurality of different nodes, respectively, may be received at the same time or within a short time.

In a tree structure, a child node may be connected to only one parent node. Likewise, in a Bluetooth mesh network of the disclosure, each node may form a path with only one high near node. Accordingly, a node that has received request packets transmitted by different nodes has to select, as a high near node, one of the plurality of nodes that has transmitted the request packets. After one node is selected, a response packet may be transmitted.

A method of selecting one of a plurality of nodes that has transmitted request packets is not performed by a node that has already registered a high near node. Hereinafter, a method of selecting, by a node, one of a plurality of surrounding nodes that has transmitted response packets as a high near node may be referred to as a near node selection method or a node selection method. The disclosure proposes three types of selection methods.

In FIG. 13, nodes A and C are nodes that have already registered high near nodes by receiving request packets and transmitting response packets. A node B is a surrounding node of the nodes A and C and is a node that has not yet registered a high near node because it has not received a request packet. The node B receives request packets broadcasted by the respective nodes A and C. FIG. 13 illustrates that the request packet transmitted by the node A is first received. Unlike in FIG. 13, request packets may be received at the same time.

The first method is a method of selecting, as a high near node, a node that has transmitted a first received request packet. If this method is applied to the case of FIG. 13, the node B first determines, as high near node, the node A that has first transmitted a request packet, and transmits a response packet to the node A.

If packets are broadcasted at the same time, the probability that a packet transmitted by a nearer node will be reached earlier is high. Accordingly, in this method, a nearer node may be selected as a high near node, and a path can be rapidly formed.

The second method is a method of selecting a high near node based on transmission success ratios of request packets broadcasted by surrounding nodes plural times for a given time.

In this method, when transmitting a request packet, each node of a mesh network of the disclosure repeatedly broadcasts the request packet by a preset number for a preset time. The node calculates the transmission success ratios of received request packets and select, as a high near node, one of nodes that satisfy a preset packet transmission success ratio condition.

A packet transmission success ratio is related to the number of times that a request packet has been broadcasted and the number of times that the request packet has been received. For example, the packet transmission success ratio may be represented as a ratio (or percent) of the number of times that a request packet has been received and the number of times that a request packet has been broadcasted. Furthermore, a node may calculate a packet transmission success ratio based on the number of request packets reached within a preset time. The preset time may be set to be identical with the time taken for a request packet to be repeatedly broadcasted.

The node A broadcasts each request packet by a preset number for a preset time (S13010). The node C also broadcasts a request packet by a preset number for a preset time (S13020). The node B may receive some of or all the request packets broadcasts by the node A and the node C plural times.

For example, in the case of FIG. 13, a node may be configured to broadcast a request packet five times for 1 second. Thereafter, the node B receives the request packet broadcasted by the node A three times. The node B receives the request packet broadcasted by the node C five times. A packet transmission success ratio of the node A is 60 percent, and a packet transmission success ratio of the node C is 100 percent. A mesh system may previously set a reference for a packet transmission success ratio at which a node selects a high near node as 100 percent. In this case, the node B selects, as a high near node, the node C that satisfies the reference. Thereafter, the node B transmits a response packet to the selected high near node (S13030).

The number of times that a request packet is broadcasted, the time taken for a request packet is repeatedly broadcasted and/or the packet transmission success ratio may be previously determined, and may be properly changed depending on an inside or outside environment of a mesh network.

The number of packets transmitted to a near node is increased as the packet is broadcasted by a nearer node. Accordingly, according to this method, there is an advantage in that a path can be formed by selecting a nearer node as a high near node.

The third method is a method of selecting a high near node based on signal intensity of a received request packet.

In this method, a node that has received a plurality of request packets at the same time or within a short time selects a node that has transmitted a packet having the greatest signal intensity among the received request packets. For example, a received signal strength indicator (RSSI) may be used as a reference for the intensity of a signal.

The probability that a received signal will have greater signal intensity as the signal is transmitted by a nearer node is high. Accordingly, according to this method, there is an advantage in that a node nearer to a current node may be selected as a high near node.

In addition, the first to third methods may be combined and used. For example, a packet transmission success ratio and signal intensity of a signal may be considered at the same time. For another example, the first method may be basically used, and a case where request packets transmitted by different nodes have been transmitted almost at the same time may be complementarily used as the second or third method.

A nearer node may be determined as a high near node through the above-described methods. Accordingly, a more efficient path can be formed.

FIG. 14 illustrates a method of transmitting the status of each of nodes through a path after the path having a tree structure is formed in a Bluetooth mesh network according to an embodiment of the disclosure.

Referring to FIG. 14, status information of each node may be delivered to a root node through a pre-formed path. Accordingly, the status check of a mesh network can be performed without suddenly increasing traffic of the mesh network.

In a status check process, two types of packets may be used. i) One is a packet transmitted to a high near node by a node in order to notify its own status. Hereinafter, this packet may be called a status packet. The status packet includes status information of a node that has generated a status packet. ii) The other is a packet transmitted as a response by a node after the node receives a status packet from a low near node. Hereinafter, a packet transmitted as a response to a status packet may be called a status response packet. In order to periodically check the status of a network, a status packet may be periodically generated and transmitted.

Hereinafter, a process of checking whether each node within a network operates normally is described as an example of status check.

In a process of checking whether all nodes operate normally, two types of packets are used. i) One is a packet transmitted to a high near node by a node in order to notify that the node operates normally. Hereinafter, this packet may be denoted as a LowNodeAlive packet. ii) The other is a response packet transmitted to a low near node as a response by a node that has received a LowNodeAlive packet. Hereinafter, a packet transmitted as a response to a LowNodeAlive packet may be denoted as a HighNodeAlive packet.

A node that has transmitted a LowNodeAlive packet may check whether the transmitted LowNodeAlive packet has been delivered through a received HighNodeAlive packet. The LowNodeAlive packet may be included in the status packet. The HighNodeAlive packet may be included in a status response packet.

Table 3 illustrates LowNodeAlive packet and HighNodeAlive packet formats. In addition, other fields may be further included, and the names of the packets and fields may be changed.

TABLE 3

| Packet Name | TTL | Source Address | Destination Address | Transport PDU |
|---|---|---|---|---|
| LowNodeAlive | 1 | Own address | HighNode address | Opcode Node address, status |
| HighNodeAlive | 1 | Own address | LowNode address | Opcode |

The LowNodeAlive packet includes a time to live (TTL) field, a source address field, a destination address field and a transport PDU field. The transport PDU field includes an Opcode to identify the type of packet, the address of the final node (i.e., root node) to which a packet has to be transmitted, and status information of a current node and a delivered low node.

The TTL of the LowNodeAlive packet is set to 1. Accordingly, the LowNodeAlive packet may be delivered by only a 1-hop distance. A node that has received a LowNodeAlive packet cannot relay a received request packet. The source address is set as its own address. That is, the source address is set as the mesh address of a node that has generated the LowNodeAlive packet. The destination address is set as the mesh address of a high node. In this case, the high node may be a high near node or the root node of a current node. The Opcode is set as a specific code indicating that a corresponding packet is a LowNodeAlive packet. For example, a specific code indicative of a LowNodeAlive packet may be set as 0x0003. Furthermore, for example, address information of the final node to which a packet must be transmitted may be represented as 2 bytes, and status information may be represented as 2 bytes.

The TTL of a HighNodeAlive packet is set to 1. The HighNodeAlive packet may be delivered by only 1 hop like a LowNodeAlive packet. The source address is set as its own address. That is, the source address is set as the mesh address of a node that has generated the HighNodeAlive packet. The destination address is set as the mesh address of a low node (LowNode) that has transmitted the HighNodeAlive packet. For example, a specific code indicative of a HighNodeAlive packet may be set as 0x0004.

A node that has transmitted a LowNodeAlive packet to a high near node may confirm whether a transmitted packet has been delivered by receiving a HighNodeAlive packet from the high near node.

(a) shows an example in which a transmission path for a specific packet has been formed through the near node selection algorithm (process of FIG. 12). B is a root node that has received a start command.

(b) illustrates that nodes not having a low near node transmit, to a high near node, a LowNodeAlive packet whose TTL is set to 1. A node not having a low near node corresponds to a leaf node of a tree structure.

In (b), C, D, E, F, G, and J transmit LowNodeAlive packets to respective high near nodes. The LowNodeAlive packet may be periodically generated and transmitted every given time. Accordingly, K, H, I, B and A that have received the LowNodeAlive packets obtain status information of their low near nodes. Thereafter, K, H, I, B and A respond by transmitting respective HighNodeAlive packets to nodes that have transmitted the LowNodeAlive packets.

(c) illustrates that K, H, I and A that have received LowNodeAlive packets transmit LowNodeAlive packets to a root node B, that is, a high near node. In this case, the transmitted LowNodeAlive packet includes all of status information on a node that has generated the LowNodeAlive packet and status information on low near nodes of the node. That is, a LowNodeAlive packet generated by an internal node except the root node and a leaf node includes status information on the corresponding internal node and all low nodes (descendant nodes) of the corresponding internal node.

In (c), K generates a LowNodeAlive packet including status information of D and C and its own status information, and transmits the LowNodeAlive packet to B. Likewise, H generates a LowNodeAlive packet including status information of E and its own status information, and transmits the LowNodeAlive packet to B. I generates a LowNodeAlive packet including status information of F and its own status information, and transmits the LowNodeAlive packet to B. A generates a LowNodeAlive packet including status information of J and its own status information, and transmits the LowNodeAlive packet to B.

Each of specific packets that the root node has received from its own low near nodes includes specific information of one or more different nodes that do not overlap. For example, in FIG. 14 (c), a specific packet transmitted by H includes specific information of H and E. A specific packet transmitted by K includes specific information of C, D, and K. A specific packet transmitted by I includes specific information of I and F. A specific packet transmitted by A includes specific information of A and J. A specific packet transmitted by G includes specific information of only G. That is, a specific packet transmitted by each of H, I, K, A and G includes specific information of all different nodes.

The root node can obtain information indicating whether all the nodes except the root node operate normally through the above-described process. The root node may transmit status information of other nodes and its own status information to a control device or a server.

The processes (a) to (c) have been described based on a method of checking whether each node operates normally using a LowNodeAlive packet and HighNodeAlive packet. A process of checking a different type of status may be performed in the same way. The status check of a network can be efficiently performed without a sudden increase in traffic through the above-described process.

FIG. 15 illustrates a method of checking abnormality occurred in some nodes after the transmission path of a specific packet is formed through a near node selection algorithm in a Bluetooth mesh network according to an embodiment of the disclosure.

The mesh network disclosed in FIG. 15 presupposes that a path having a tree structure for transmitting a specific packet has already been formed through the above-described near node selection algorithm. Although not shown, the packet transmission path has the same structure as FIG. 12(f). A node B is a root node.

For example, FIG. 15 illustrates that a problem has occurred in a node J. The problem occurred in the node J may occur due to various causes inside or outside a device. The remaining nodes except the node J operate normally.

For example, hereinafter, processes (a) and (b) are described using the above-described LowNodeAlive packet and HighNodeAlive packet. The LowNodeAlive packet is a status packet, and may be transmitted to the root node through the formed path.

(a) illustrates that C, D, E, F and G, that is, leaf nodes, transmit LowNodeAlive packets to high near nodes.

The LowNodeAlive packet may be configured to be periodically transmitted. In this case, the status check of the network may be performed at given time intervals. Each of B, I, H and K receives the LowNodeAlive packet and transmits a HighNodeAlive packet as a response.

J may not transmit a LowNodeAlive packet to A, that is, a high near node, within a timeout time because it does not operate normally. In this case, A cannot obtain status information of J. Furthermore, A does not transmit a HighNodeAlive packet because it has not received a LowNodeAlive packet.

(b) illustrates that internal nodes transmit LowNodeAlive packets to the root node. The internal nodes are H, I, K and A except a leaf node and the root node.

The internal node may periodically transmit a LowNodeAlive packet to a high node regardless of whether it has received a LowNodeAlive packet from a low near node within a timeout.

If an internal node receives a LowNodeAlive packet from a low near node within a timeout, it generates a LowNodeAlive packet including its own status information and status information of a low node(s), and transmit it to a high near node.

If an internal node has not received a LowNodeAlive packet from a low near node within a timeout, it generates a LowNodeAlive packet including its own status information and transmits the LowNodeAlive packet to a high near node. In this case, the internal node may transmit the LowNodeAlive packet along with information indicating that abnormality has occurred in a specific node.

In FIG. 15(b), each of I, H and K generates a LowNodeAlive packet including status information of a low node, and transmits the LowNodeAlive packet to the root node, that is, a high near node. A has not received a timeout LowNodeAlive packet from J, that is, a low near node ((a) process). Accordingly, A generates a LowNodeAlive packet including information indicating that it has not received status information of J or information indicating that abnormality has occurred in J along with its own status information, and transmits the generated packet to B. Accordingly, the mesh network can be aware that abnormality has occurred in J.

The mesh system can check that abnormality has occurred in which node through the above-described method.

FIG. 16 illustrates a flowchart of a process of obtaining, by a root node, specific information of other nodes using a specific packet in a Bluetooth mesh network according to an embodiment of the disclosure.

FIG. 16 shows a detailed process performed in the root node of FIGS. 11 and 12.

The root node obtains a start command (S16010). The start command may correspond to a message identical or similar to the start command message described in FIG. 12(a).

Thereafter, the root node broadcasts a request packet for discovering a node near the root node (S16020). The request packet may be the above-described FindNearNode packet. For detailed contents related to the FindNearNode packet, reference is made to the description of FIG. 12.

Thereafter, the root node receives a response packet for a request packet from each of a plurality of nodes that has received the request packet (S16030). The response packet may be the above-described SelectNode packet.

The root node registers the plurality of nodes that has transmitted the response packets as low near nodes (S16040). The low near node delivers specific information. For detailed contents related to the low near node, reference is made to the detailed description of FIG. 11.

The root node receives a specific packet, including specific information, from each of the plurality of nodes belonging to the low near nodes (S16050). The received specific packet includes specific information of one or more different nodes that does not overlap. For detailed contents of this step, reference is made to the description of FIG. 14(c).

FIG. 17 illustrates a flowchart of a process of transmitting, by a node other than a root node, specific information to a high near node using a specific packet in a Bluetooth mesh network according to an embodiment of the disclosure.

FIG. 17 illustrates a process of transmitting, by nodes other than a root node, specific information to the root node. The process of FIG. 17 may be performed in an internal node or leaf node of a tree structure.

A first node receives a first request packet broadcasted by another node in order to discover a node near another node (S17010).

The first node registers the node that has transmitted the first request packet as a high near node (S17020). The high near node is a destination node to which a specific packet generated by the first node is transmitted.

The first node broadcasts a second request packet for discovering a node near the first node (S17030).

If the second request packet is transmitted to the near node, the first node receives a response packet for the second request packet from the node that has received the second request packet (S17040). If the second request packet has not been transmitted to the near node, the first node does not perform an additional process.

The first request packet and the second request packet may be the above-described FindNearNode packet. For detailed contents related to the FindNearNode packet, reference is made to the description of FIG. 12.

The first node registers the node that has transmitted the response packet as a low near node (S17050). The low near node delivers specific information to the first node using a specific packet. For detailed contents related to the high near node and the low near node, reference is made to the detailed description of FIG. 11.

The first node receives a first specific packet, including first specific information, from the low near node (S17060). The first node generates a second specific packet and transmits the second specific packet to the high near node (S17070). The second specific packet includes first specific information and second specific information of the first node. The first specific packet and the second specific packet may be the above-described LowNodeAlive packet. For detailed contents related to the LowNodeAlive packet, reference is made to the description of FIGS. 14 and 15.

Furthermore, the drawings have been separated and described for convenience of description, but the embodiments described with reference to the drawings may be merged and designed to implement a new embodiment.

Furthermore, to design a computer-readable recoding medium on which a program for executing the above-described embodiments has been recorded according to the needs of a person having ordinary skill in the art falls within the scope of the disclosure.

The gateway selection and connection method of the disclosure are not limitedly applied to the elements and methods according to the above-described embodiments, and some of or all the above-described embodiments may be selectively combined and configured so that the embodiments are modified in various manners.

Meanwhile, the gateway selection and connection method of the disclosure may be implemented in a processor-readable recording medium included in a network device, in the form of processor-readable code. The processor-readable recording medium includes all types of recording devices in which data readable by a processor is stored. The processor-readable recording medium may include ROM, RAM, CD-ROM, magnetic tapes, floppy disks, and optical data storage devices, for example. Furthermore, the processor-readable recording medium may be implemented in the form of carrier waves, such as transmission through the Internet. Furthermore, the processor-readable recording medium may be distributed to computer systems connected over a network, and the processor-readable code may be stored and executed in a distributed manner.

Furthermore, although preferred embodiments have been illustrated and described above, disclosure is not limited to the above-described specific embodiments, and a person having ordinary skill in the art to which disclosure pertains may modify the disclosure in various ways without departing from the gist of the disclosure in the claims. Such modified embodiments should not be individually understood from the technical spirit or prospect of disclosure.

Furthermore, in disclosure, both the apparatus disclosure and the method disclosure have been described, but the descriptions of both the disclosures may be complementally applied, if necessary.

INDUSTRIAL APPLICABILITY

The data transmission and reception method of the disclosure has been described based on an example in which it is applied to Bluetooth LE, but may be applied to various wireless communication systems in addition to a Bluetooth LE system.

The invention claimed is:

1. A method of transmitting and receiving, by a first node, data in a Bluetooth mesh network, the method comprising:
    receiving a first request packet broadcasted by another node included in the Bluetooth mesh network in order to discover a node near the another node;
    registering, as a high near node, the node that has transmitted the first request packet;
    broadcasting a second request packet for discovering a node near the first node;
    receiving a response packet for the second request packet from a node that has received the second request packet if the second request packet is transmitted to a near node;
    registering, as a low near node, the node that has transmitted the response packet;
    receiving, from the low near node, a first specific packet comprising first specific information; and
    generating a second specific packet and transmitting the second specific packet to the high near node,
    wherein the high near node is a destination node of the second specific packet, the low near node is a node delivering second specific information, and the second specific packet comprises the first specific information and the second specific information of the first node,
    wherein the receiving the first request packet further comprises:
    selecting one node among a plurality of near nodes, based on the first node receiving a plurality of different request packets broadcasted by the plurality of near nodes, respectively,
    wherein the one node is selected based on transmission success ratios of the different request packets broadcasted by the plurality of near nodes,
    wherein each of the transmission success ratios is determined based on a ratio of (i) a number of times that each of the different request packets is repeatedly broadcasted to (ii) a number of times that each of the different request packets is received by the first node during a preset time, and wherein the selected one node is registered as the high near node.

* * * * *